United States Patent
Hansen et al.

(10) Patent No.: US 7,096,205 B2
(45) Date of Patent: *Aug. 22, 2006

(54) SYSTEMS AND METHODS FOR ENROLLING CONSUMERS IN GOODS AND SERVICES

(75) Inventors: Kurt L. Hansen, Castle Rock, CO (US); Keith W. Diveley, Highlands Ranch, CO (US)

(73) Assignee: First Data Corporation, Englewood, CO (US)

( * ) Notice: Subject to any disclaimer, the term of this patent is extended or adjusted under 35 U.S.C. 154(b) by 385 days.
This patent is subject to a terminal disclaimer.

(21) Appl. No.: 10/112,440

(22) Filed: Mar. 29, 2002

(65) Prior Publication Data
US 2002/0178025 A1    Nov. 28, 2002

Related U.S. Application Data

(63) Continuation-in-part of application No. 10/007,701, filed on Dec. 10, 2001, which is a continuation-in-part of application No. 09/823,697, filed on Mar. 31, 2001, and a continuation-in-part of application No. 09/990,702, filed on Nov. 9, 2001.

(51) Int. Cl.
*G06F 17/60* (2006.01)
(52) U.S. Cl. .............................. 705/74; 705/14; 705/16; 705/26; 705/34; 705/35; 705/39; 705/40; 705/41; 705/42; 705/43; 705/44; 705/45; 705/65; 705/66; 705/67; 705/75; 705/76; 705/77; 705/78; 235/375; 235/376; 235/377; 235/378; 235/379; 235/380; 235/381; 379/114
(58) Field of Classification Search ................. 705/51, 705/27, 14, 16, 26, 34, 35, 39–45, 65–67, 705/74–78; 235/375–381; 379/114
See application file for complete search history.

(56) References Cited

U.S. PATENT DOCUMENTS

| | | | |
|---|---|---|---|
| 3,599,151 A | 8/1971 | Harr | |
| 3,783,755 A | 1/1974 | Lagin | |
| 3,833,395 A | 9/1974 | Gosnell | |
| 4,032,931 A | 6/1977 | Haker | |
| 4,321,672 A | 3/1982 | Braun et al. | |
| 4,454,414 A | 6/1984 | Benton | |
| 4,562,340 A | 12/1985 | Tateisi et al. | |
| 4,562,341 A | 12/1985 | Ohmae et al. | |
| 4,630,200 A | 12/1986 | Ohmae et al. | |

(Continued)

FOREIGN PATENT DOCUMENTS

EP     0 481 135 A1     4/1992

(Continued)

OTHER PUBLICATIONS

LowerMyBills.com (May 24, 2001). http://web.archive.org/web/20010524075855/http://www.lowermybills.com/. Retrieved Aug. 5, 2004 Online.*

(Continued)

*Primary Examiner*—James A Reagan
(74) *Attorney, Agent, or Firm*—Townsend and Townsend and Crew LLP

(57) ABSTRACT

Systems and methods for enrolling consumers in goods and services offered by a consumer provider are disclosed herein. Various of the methods include providing an enrollment system and displaying enrollment options via the enrollment system. Further, the methods include receiving enrollment requests and enrolling a consumer based on the enrollment request. The systems can be configured for effectuating the various enrollment methods.

19 Claims, 17 Drawing Sheets

U.S. PATENT DOCUMENTS

| | | |
|---|---|---|
| 4,678,895 A | 7/1987 | Tateisi et al. |
| 4,722,554 A | 2/1988 | Pettit |
| 4,812,628 A | 3/1989 | Boston et al. |
| 4,902,881 A | 2/1990 | Janku |
| 4,961,142 A | 10/1990 | Elliott et al. |
| 4,972,318 A | 11/1990 | Brown et al. |
| 5,021,967 A | 6/1991 | Smith |
| 5,053,607 A | 10/1991 | Carlson et al. |
| 5,119,293 A | 6/1992 | Hammond |
| 5,175,682 A | 12/1992 | Higashiyama et al. |
| 5,220,501 A | 6/1993 | Lawlor et al. |
| 5,283,829 A | 2/1994 | Anderson |
| 5,350,906 A | 9/1994 | Brody et al. |
| 5,367,452 A | 11/1994 | Gallery et al. |
| 5,408,077 A | 4/1995 | Campo et al. |
| 5,426,594 A | 6/1995 | Wright et al. |
| 5,448,043 A | 9/1995 | Nakano et al. |
| 5,461,217 A | 10/1995 | Claus |
| 5,464,971 A | 11/1995 | Sutcliffe et al. |
| 5,465,206 A | 11/1995 | Hilt et al. |
| 5,477,037 A | 12/1995 | Berger |
| 5,477,038 A | 12/1995 | Levine et al. |
| 5,484,988 A | 1/1996 | Hills et al. |
| 5,491,325 A | 2/1996 | Huang et al. |
| 5,504,677 A | 4/1996 | Pollin |
| 5,510,979 A | 4/1996 | Moderi et al. |
| 5,513,117 A | 4/1996 | Small |
| 5,524,073 A | 6/1996 | Stambler |
| 5,555,496 A | 9/1996 | Tackbary et al. |
| 5,570,465 A | 10/1996 | Tsakanikas |
| 5,577,109 A | 11/1996 | Stimson et al. |
| 5,604,802 A | 2/1997 | Holloway |
| 5,622,388 A | 4/1997 | Alcordo |
| 5,629,982 A | 5/1997 | Micali |
| 5,638,283 A | 6/1997 | Herbert |
| 5,649,117 A | 7/1997 | Landry |
| 5,650,604 A | 7/1997 | Marcous et al. |
| 5,657,201 A | 8/1997 | Kochis |
| 5,677,955 A | 10/1997 | Doggett et al. |
| 5,679,940 A | 10/1997 | Templeton et al. |
| 5,699,528 A | 12/1997 | Hogan |
| 5,717,868 A | 2/1998 | James |
| 5,721,768 A | 2/1998 | Stimson et al. |
| 5,732,136 A | 3/1998 | Murphree et al. |
| 5,732,400 A | 3/1998 | Mandler et al. |
| 5,745,886 A | 4/1998 | Rosen |
| 5,757,917 A | 5/1998 | Rose et al. |
| 5,764,888 A | 6/1998 | Bolan et al. |
| 5,774,879 A | 6/1998 | Custy et al. |
| 5,778,067 A | 7/1998 | Jones et al. |
| 5,779,379 A | 7/1998 | Mason et al. |
| 5,783,808 A | 7/1998 | Josephson |
| 5,787,403 A | 7/1998 | Randle |
| 5,794,207 A | 8/1998 | Walker et al. |
| 5,815,657 A | 9/1998 | Williams et al. |
| 5,825,617 A | 10/1998 | Kochis et al. |
| 5,826,241 A | 10/1998 | Stein et al. |
| 5,828,875 A | 10/1998 | Halvarsson et al. |
| 5,832,463 A | 11/1998 | Funk |
| 5,870,718 A | 2/1999 | Spector |
| 5,875,435 A | 2/1999 | Brown |
| 5,878,211 A | 3/1999 | Delagrange et al. |
| 5,880,446 A | 3/1999 | Mori et al. |
| 5,893,080 A | 4/1999 | McGurl et al. |
| 5,896,298 A | 4/1999 | Richter |
| 5,897,625 A | 4/1999 | Gustin et al. |
| 5,897,989 A | 4/1999 | Beecham |
| 5,898,154 A | 4/1999 | Rosen |
| 5,899,980 A | 5/1999 | Wilf et al. |
| 5,899,982 A | 5/1999 | Randle |
| 5,902,983 A | 5/1999 | Crevelt et al. |
| 5,903,633 A * | 5/1999 | Lorsch .................. 379/114.2 |
| 5,903,881 A | 5/1999 | Schrader et al. |
| 5,909,492 A | 6/1999 | Payne et al. |
| 5,909,673 A | 6/1999 | Gregory |
| 5,910,988 A | 6/1999 | Ballard |
| 5,913,202 A | 6/1999 | Motoyama |
| 5,915,023 A | 6/1999 | Bernstein |
| 5,920,629 A | 7/1999 | Rosen |
| 5,920,847 A | 7/1999 | Kolling et al. |
| 5,920,848 A | 7/1999 | Schutzer et al. |
| 5,937,396 A | 8/1999 | Konya |
| 5,949,044 A | 9/1999 | Walker et al. |
| 5,952,639 A | 9/1999 | Ohki et al. |
| 5,953,709 A | 9/1999 | Gilbert et al. |
| 5,953,710 A | 9/1999 | Fleming |
| 5,960,412 A | 9/1999 | Tackbary et al. |
| 5,963,647 A | 10/1999 | Downing et al. |
| 5,974,146 A | 10/1999 | Randle et al. |
| 5,974,194 A | 10/1999 | Tackbary et al. |
| RE36,365 E | 11/1999 | Levine et al. |
| 5,987,426 A | 11/1999 | Goodwin, III |
| 5,993,047 A | 11/1999 | Novogrod et al. |
| 5,999,624 A | 12/1999 | Hopkins |
| 6,003,763 A | 12/1999 | Gallagher et al. |
| 6,011,833 A | 1/2000 | West |
| 6,012,048 A | 1/2000 | Gustin et al. |
| 6,015,087 A | 1/2000 | Seifert et al. |
| 6,027,216 A | 2/2000 | Guyton |
| 6,029,150 A | 2/2000 | Kravitz |
| 6,030,000 A | 2/2000 | Diamond |
| 6,032,133 A | 2/2000 | Hilt et al. |
| 6,032,137 A | 2/2000 | Ballard |
| 6,035,285 A | 3/2000 | Schlect et al. |
| 6,035,406 A | 3/2000 | Moussa et al. |
| 6,039,245 A | 3/2000 | Symonds et al. |
| 6,039,250 A | 3/2000 | Ito et al. |
| 6,044,360 A | 3/2000 | Picciallo |
| 6,044,362 A | 3/2000 | Neely |
| 6,045,039 A | 4/2000 | Stinson et al. |
| 6,047,268 A | 4/2000 | Bartoli et al. |
| 6,058,417 A | 5/2000 | Hess et al. |
| 6,064,990 A | 5/2000 | Goldsmith |
| 6,070,150 A | 5/2000 | Remington et al. |
| 6,070,156 A | 5/2000 | Hartsell et al. |
| 6,070,798 A | 6/2000 | Nethery |
| 6,078,907 A | 6/2000 | Lamm |
| 6,081,790 A | 6/2000 | Rosen |
| 6,088,683 A | 7/2000 | Jalili |
| 6,088,684 A | 7/2000 | Custy et al. |
| 6,097,834 A | 8/2000 | Krouse et al. |
| 6,098,053 A | 8/2000 | Slater |
| 6,106,020 A | 8/2000 | Leef et al. |
| 6,119,106 A | 9/2000 | Mersky et al. |
| 6,119,931 A | 9/2000 | Novogrod |
| 6,122,625 A | 9/2000 | Rosen |
| 6,128,603 A | 10/2000 | Dent et al. |
| 6,134,561 A | 10/2000 | Brandien et al. |
| 6,145,738 A | 11/2000 | Stinson et al. |
| 6,148,377 A | 11/2000 | Carter et al. |
| 6,149,056 A | 11/2000 | Stinson et al. |
| 6,164,528 A | 12/2000 | Hills et al. |
| 6,167,386 A | 12/2000 | Brown |
| 6,175,823 B1 | 1/2001 | Van Dusen |
| 6,189,787 B1 | 2/2001 | Dorf |
| 6,193,152 B1 | 2/2001 | Fernando et al. |
| 6,199,761 B1 | 3/2001 | Drexler |
| 6,202,054 B1 | 3/2001 | Lawlor et al. |
| 6,206,283 B1 | 3/2001 | Bansal et al. |
| RE37,122 E | 4/2001 | Levine et al. |
| 6,223,168 B1 | 4/2001 | McGurl et al. |
| 6,246,996 B1 | 6/2001 | Stein et al. |
| 6,247,047 B1 | 6/2001 | Wolff |
| 6,260,024 B1 | 7/2001 | Shkedy |

| | | |
|---|---|---|
| 6,263,446 B1 | 7/2001 | Kausik et al. |
| 6,269,369 B1 | 7/2001 | Robertson |
| 6,275,829 B1 | 8/2001 | Angiulo et al. |
| 6,286,756 B1 | 9/2001 | Stinson et al. |
| 6,289,322 B1 | 9/2001 | Kitchen et al. |
| 6,292,789 B1 | 9/2001 | Schutzer |
| 6,305,604 B1 | 10/2001 | Ono |
| 6,308,887 B1 | 10/2001 | Korman et al. |
| 6,314,169 B1 | 11/2001 | Schelberg, Jr. et al. |
| 6,317,745 B1 | 11/2001 | Thomas et al. |
| 6,321,211 B1 | 11/2001 | Dodd |
| 6,321,984 B1 | 11/2001 | McCall et al. |
| 6,327,570 B1 | 12/2001 | Stevens |
| 6,327,575 B1 | 12/2001 | Katz |
| 6,343,279 B1 | 1/2002 | Bissonette et al. |
| 6,347,305 B1 | 2/2002 | Watkins |
| 6,360,254 B1 | 3/2002 | Linden et al. |
| 6,367,693 B1 | 4/2002 | Novogrod |
| 6,394,343 B1 | 5/2002 | Berg et al. |
| 6,408,284 B1 | 6/2002 | Hilt et al. |
| 6,411,942 B1 | 6/2002 | Fujimoto |
| 6,415,271 B1 | 7/2002 | Turk et al. |
| 6,438,586 B1 | 8/2002 | Hass |
| 6,449,599 B1 | 9/2002 | Payne et al. |
| 6,453,300 B1 | 9/2002 | Simpson |
| 6,473,500 B1 * | 10/2002 | Risafi et al. ........... 379/144.01 |
| 6,484,936 B1 | 11/2002 | Nicoll et al. |
| 6,488,203 B1 | 12/2002 | Stoutenburg et al. |
| 6,502,747 B1 | 1/2003 | Stoutenburg et al. |
| 6,510,453 B1 | 1/2003 | Apfel et al. |
| 6,539,363 B1 | 3/2003 | Allgeier et al. |
| 6,547,132 B1 | 4/2003 | Templeton et al. |
| 6,549,119 B1 | 4/2003 | Turner |
| 6,554,184 B1 | 4/2003 | Amos |
| 6,609,113 B1 | 8/2003 | O'Leary et al. |
| RE38,255 E | 9/2003 | Levine et al. |
| 6,618,705 B1 | 9/2003 | Wang et al. |
| 6,736,314 B1 | 5/2004 | Cooper et al. |
| 6,761,309 B1 | 7/2004 | Stoutenburg et al. |
| 6,761,311 B1 | 7/2004 | Algiene et al. |
| 6,814,282 B1 | 11/2004 | Seifert et al. |
| 6,827,260 B1 | 12/2004 | Stoutenburg et al. |
| 6,829,588 B1 | 12/2004 | Stoutenburg et al. |
| 6,847,947 B1 | 1/2005 | Kambour et al. |
| 6,886,742 B1 | 5/2005 | Stoutenburg et al. |
| 6,908,031 B1 | 6/2005 | Seifert et al. |
| 6,922,673 B1 | 7/2005 | Karas et al. |
| 2001/0032878 A1 | 10/2001 | Tsiounis et al. |
| 2001/0042785 A1 | 11/2001 | Walker et al. |
| 2001/0051876 A1 | 12/2001 | Seigel et al. |
| 2001/0054003 A1 | 12/2001 | Chien et al. |
| 2002/0016769 A1 | 2/2002 | Barbara et al. |
| 2002/0023055 A1 | 2/2002 | Antognini et al. |
| 2002/0032653 A1 | 3/2002 | Schutzer |
| 2002/0046106 A1 | 4/2002 | Ishibashi et al. |
| 2002/0062285 A1 | 5/2002 | Amann |
| 2002/0087462 A1 | 7/2002 | Stoutenburg et al. |
| 2002/0087463 A1 | 7/2002 | Fitzgerald et al. |
| 2002/0087467 A1 | 7/2002 | Muscavage et al. |
| 2002/0104026 A1 | 8/2002 | Barra et al. |
| 2002/0111908 A1 | 8/2002 | Milberger et al. |
| 2002/0152168 A1 | 10/2002 | Neofytides et al. |
| 2002/0152176 A1 | 10/2002 | Neofytides et al. |
| 2002/0153414 A1 | 10/2002 | Stoutenburg et al. |
| 2002/0161702 A1 | 10/2002 | Milberger et al. |
| 2003/0024979 A1 | 2/2003 | Hansen et al. |
| 2003/0028491 A1 | 2/2003 | Cooper |
| 2003/0055780 A1 | 3/2003 | Hansen et al. |
| 2003/0069856 A1 | 4/2003 | Seifert et al. |
| 2003/0111529 A1 | 6/2003 | Templeton et al. |
| 2003/0120777 A1 | 6/2003 | Thompson et al. |
| 2003/0126036 A1 | 7/2003 | Mascavage et al. |
| 2003/0126075 A1 | 7/2003 | Mascavage et al. |
| 2003/0126083 A1 | 7/2003 | Seifert et al. |
| 2003/0130907 A1 | 7/2003 | Karas et al. |
| 2003/0130940 A1 | 7/2003 | Hansen et al. |
| 2003/0130948 A1 | 7/2003 | Algiene et al. |
| 2003/0135459 A1 | 7/2003 | Abelman et al. |
| 2003/0149662 A1 | 8/2003 | Shore |
| 2003/0154164 A1 | 8/2003 | Mascavage et al. |
| 2003/0167237 A1 | 9/2003 | Degen et al. |
| 2003/0177067 A1 | 9/2003 | Cowell et al. |
| 2003/0187789 A1 | 10/2003 | Karas et al. |
| 2003/0187791 A1 | 10/2003 | Weichert et al. |
| 2003/0187792 A1 | 10/2003 | Hansen et al. |
| 2003/0195811 A1 | 10/2003 | Hayes et al. |
| 2003/0208445 A1 | 11/2003 | Compiano |
| 2003/0222135 A1 | 12/2003 | Stoutenburg et al. |
| 2003/0222136 A1 | 12/2003 | Bolle et al. |
| 2003/0225689 A1 | 12/2003 | MacFarlane et al. |
| 2004/0015438 A1 | 1/2004 | Compiano |
| 2004/0024701 A1 | 2/2004 | Hansen et al. |
| 2004/0059672 A1 | 3/2004 | Baig et al. |
| 2004/0068437 A1 | 4/2004 | McGee et al. |
| 2004/0078327 A1 | 4/2004 | Frazier et al. |
| 2004/0088248 A1 | 5/2004 | Culler |
| 2004/0088261 A1 | 5/2004 | Moore et al. |
| 2004/0098328 A1 | 5/2004 | Grant et al. |
| 2004/0098335 A1 | 5/2004 | Michelsen |
| 2004/0107165 A1 | 6/2004 | Blair et al. |
| 2004/0117302 A1 | 6/2004 | Weichert et al. |
| 2004/0138947 A1 | 7/2004 | McGee et al. |
| 2004/0139008 A1 | 7/2004 | Muscavage et al. |
| 2004/0143552 A1 | 7/2004 | Weichert et al. |
| 2004/0148286 A1 | 7/2004 | Rogers |
| 2004/0153398 A1 | 8/2004 | Baumgartner et al. |
| 2004/0158521 A1 | 8/2004 | Newton et al. |
| 2004/0167860 A1 | 8/2004 | Baxter et al. |
| 2004/0193897 A1 | 9/2004 | Van Volkenburgh |
| 2004/0210476 A1 | 10/2004 | Blair et al. |
| 2004/0210506 A1 | 10/2004 | Algiene et al. |
| 2004/0210521 A1 | 10/2004 | Crea et al. |
| 2004/0210523 A1 | 10/2004 | Gains et al. |
| 2004/0211831 A1 | 10/2004 | Stoutenburg et al. |
| 2004/0254833 A1 | 12/2004 | Algiene et al. |
| 2005/0017067 A1 | 1/2005 | Weinberger |
| 2005/0167481 A1 | 8/2005 | Hansen et al. |
| 2005/0180550 A1 | 8/2005 | McGee et al. |
| 2005/0187929 A1 | 8/2005 | Staggs |
| 2005/0209958 A1 | 9/2005 | Michelsen |
| 2005/0209961 A1 | 9/2005 | Michelsen |

FOREIGN PATENT DOCUMENTS

| | | |
|---|---|---|
| EP | 0 745 961 A2 | 4/1996 |
| EP | 0 745 961 A3 | 7/1998 |
| EP | 0 949 596 A2 | 10/1999 |
| EP | 1 077 436 A2 | 2/2001 |
| FR | 2728983 A1 | 7/1996 |
| NL | EP700023 A1 * | 8/1995 |
| WO | WO 96/26508 A1 | 8/1996 |
| WO | WO 98/49644 A1 | 11/1998 |
| WO | WO 98/50875 A2 | 11/1998 |
| WO | WO 99/22291 A1 | 5/1999 |
| WO | WO 99/28872 A1 | 6/1999 |
| WO | WO 00/22559 A1 | 4/2000 |
| WO | WO 00/46725 A1 | 8/2000 |
| WO | WO 00/54122 A2 | 9/2000 |
| WO | WO 00/54122 A3 | 9/2000 |
| WO | WO 00/67177 A2 | 11/2000 |
| WO | WO 00/79452 A2 | 12/2000 |
| WO | WO 01/04816 A1 | 1/2001 |
| WO | WO 01/33522 A1 | 5/2001 |
| WO | WO 01/39093 A1 | 5/2001 |

WO WO 02/05195 A1 1/2002

OTHER PUBLICATIONS

Anonymous: "Payment Systems: Western Union Service for Overdue Accounts Resolving Delinquent Cards." Card News. Potomac: Aug. 13, 1990. vol. 5, Iss 15; p. 4.*
Anonymous: "Western Union Service Growing." Bank Letter. New York: May 28, 1990. vol. 14, Iss 21: p. 8.*
Cornwell, Ted: "Western Union Reports Growth in Late payment Collection Service." National Mortgage News. New York. May 5, 1997. vol. 21; p. 64.*
Business Wire, "E-Commerce, Email and E-greeting Cards Combine in New Web Site Designed by Interactive Bureau; Flooz.com Features a Fun Online Gift Currency You Send by Email for Any Occasion", downloaded from website http://www.proquest.umi.com, 2 pages.
DOTBANK, *The Way to Send and Receive Money on the Internet*, downloaded from website http://www.dotbank.com, Feb. 7, 2000, 7 pages.
http://www.vfi-finance.com/tranz330.htm, Tranz 330 Fast, Low-Cost Transaction Automation At The Point Of Service, VeriFone Finance, Jan. 1999, pp. 1-3, especially pp. 1-2, 2 pages.
Lawton, George; "Biometrics: A New Era in Security"; 1998, Computer, vol. 31, No. 8, pp. 16-18.
Stockel, Anna; "Securing Data and Financial Transactions"; 1995, Institute of Electrical and Electronics Engineers 29th Annual Conference, pp. 397-401.
TRANSPOINT, "The Way to Pay Online", downloaded from website http://www.transpoint.com/ on Feb. 10, 2000, 12 pages.
x.com, Do More with Your Money, downloaded from website http://www.x.com., Feb, 07, 2000, 5 pages.
Press Release: "Western Union Announces ATM Card Payout for Money Transfer Transactions"; 2001, URL: http://news.firstdata.com/media/ReleaseDetail.cfm?ReleaseID=849995>.
Levin, Gary; "Western Union not fading into sunset; new services are added as telegrams drop"; 1992, 2 pages.
"Quick Collect"; Western Union Training Guide; 2004, 10 pages.
"Send your payment using Western Union Quick Collect"; 2 pages.
"Purchasing American Airlines Tickets Just Got Easier"; 2005, 4 pages.
"Lan Airline Alliance Carriers and Western Union Offer Travelers Additional Payment Options"; 2005, 3 pages.
Quick Collect: Government/Child Support Agency Name, Training Guide; 2004, 8 pages.
"Western Union Quick Collect; 3 Easy Ways to Send a Payment: In Person, Online or by Phone!"; 2 pages.
"Western Union: Now, using our service is even more rewarding"; 1 page.
"To send a Quick Collect Payment"; sample form, 1 page.
"Western Union: Some Quick Facts about Quick Collect"; 1 page.
"Quick Collect Sales Presentation"; 28 pages.
"Western Union Quick Collect"; 2 pages.
"Why Send Your Customers Across Town When You Can Send Them Next Door?"; 2005, 1 page.
"There's a lot to be said about the many advantages of the Quick Collect service. And look who's saying it"; 4 pages.
"If you're not getting your payment with Quick Collect, chances are you're not getting it"; 2001, 2 pages.
"Western Union: Ford Credit Phone Pay-How does it work?", 2001, 1 page.
Western Union Quick Collect: The Fastest way to collect good funds; 1999, 11 pages.
"Only Western Union"; 2 pages.
"Announcing Quick Collect Online"; 2002, Western Union's Professional Collector, 3 pages.
"When You're helping a customer make a crucial payment there's no room for guesswork"; 2002, Western Union's Professional Collector, 3 pages.
"Western Union Quick Collect: The most agents, the most locations, the most experienced"; 2000, 2 pages.

"It takes a certain person to make a good collector. But it takes a good manager to make a champion"; 2001, Western Union's Professional Collector, 3 pages.
"Nationwide Credit Collectors Act Globally"; 2001, Western Union's Professional Collector, 3 pages.
"Guess What? The check's not in the mail"; 2001, Western Union's Professional Collector, 3 pages.
"Quick Cash and Quick Collect: Western Union's money-movers"; 1990, *Newsbriefs*, vol. 2, No. 1, 3 pages.
You're sending more than a payment: Point-of-Sale & Merchandising Support Advertising Materials, 2 pages.
"Company Profile: The Western Union Convenience Pay Service"; 2004, 4 pages.
"You're sending more than a payment: You're sending peace of mind"; 2004, 3 pages.
"SBC Communications adds Western Union Locations for Walk-in Customer Bill Payments"; SBC News Release, 2 pages.
"Send Your Utility Bill Payment from Here!"; 3 pages.
"Rhode Island becomes first state to accept child support payments at Western Union: More than 50 Western Union Convenience Pay Agent Locations Offer New Level of Convenience to Rhode Island Residents Who Pay Child Support—"; 2002, 3 pages.
"Rhode Island becomes first state to accept child support payments at Western Union: Government Payment Leader govONE Solutions Adds Walk-in to Full Suite of Payment Options"; 2002, 3 pages.
"State of Hawaii to Accept Child Support Payments at Western Union"; 2004, 2 pages.
"Annual Report of the President of the Western Union Telegraph Company"; 1873, pp. 8-11.
"First located example of a money transfer"; Aug. 25, 1873, 1 page.
"Annual Report of the President of the Western Union Telegraph Company"; 1874, pp. 8-11.
"The Western Union Telegraph Company: Rules for Money Transfer Service"; 1908, pp. 3-25.
"The Western Union Telegraph Company: Delivery Department Instructions"; 1926, Commercial Bulletin No. 9-A, 2 pages.
"The Western Union Telegraph Company:Instructions for Receiving Clerks"; 1929, Commercial Bulletin No. 37-A, 2 pages.
"Annual Report of the Western Union Telegraph Company"; 1935, 2 pages.
"Dots and Dashes"; 1935, vol. 11, No. 9, 4 pages.
"Annual Report of the Western Union Telegraph Company"; 1940, pp. 9 and 22.
"Annual Report of the Western Union Telegraph Company"; 1947, 2 pages.
"Annual Report of the Western Union Telegraph Company"; 1949, 2 pages.
"Annual Report of the Western Union Telegraph Company"; 1951, 2 pages.
"Annual Report of the Western Union Telegraph Company"; 1953, 2 pages.
"Annual Report of the Western Union Telegraph Company"; 1954, 3 pages.
"Annual Report of the Western Union Telegraph Company"; 1973, 5 pages.
"Annual Report of the Western Union Telegraph Company"; 1974, 2 pages.
"Quarterly Report, 1st Quarter of the Western Union Telegraph Company"; 1978, 2 pages.
"Annual Report of the Western Union Telegraph Company"; 1981, 2 pages.
"Amex Money Order Dispenser"; 1990, The Nilson Report, 1 page.
"Quick Cash and Quick Collect: Western Union's money-movers"; 1990, Newsbriefs, vol. 2, No. 1, 3 pages.
"Western Union's Would-Be Rival"; 1990, American Banker, 1 page.
"American Express in New Ad Drive"; 1990, American Banker, 1 page.
"American Express Unit Introduces State-Of-The-Art Automated Money Order Dispenser"; 1990, Tri-State Food News, 1 page.
"Annual Report of the Western Union Corporation"; 1990, 4 pages.

"Collection by Money Transfer: MoneyGram Service Removes Time-Consuming Steps to Commercial Collections"; 1990, Collector, p. 36.
"Amex tests Moneygram"; 1990, Adnews, 1 page.
"Amex aims expansion strategy at local currency exchanges"; 1990, Crain's Chicago Business, 1 page.
"Sending Cash in a Flash"; 1990, Travel & Leisure, p. 42.
". . . And a Nine-Second Money Order Dispenser"; 1991, Post-News, vol. 17, No. 1, 1 page.
"Money-wire giants battle for business: Currency exchanges wooed"; 1991, Chicago Sun Times, 2 pages.
"Sending Cash in a Flash: There are more ways to do it than you might think"; 1991, 2 pages.
"Loved one stranded? Send Cash"; 1991, Akron Beacon Journal, 2 pages.
"Common Values: Uncommon Opportunities"; 1995, First Data Corporation Annual Report, 2 pages.
"Behind the Scenes of Life"; 1996, First Data Corporation Annual Report, 3 pages.
"First Data InfoSource Offers Database Analysis with DecisionScope"; 1996, First Data Corporation News Release, 2 pages.
First Data and Netscape Offering Internet Payment Processing Service; 1996, First Data Corporation News Release, 3 pages.
"CES/NaBANCO Introduces Stored Value Card Technology: Blockbuster Video is First Merchant Partner"; 1996, First Data Corporation News Release, 3 pages.
"First Data to Offer Card Profitability Software from HNC: Distribution Agreement Poised to Repeat Falcon Success";1996, HNC Software, Inc. News Release, 3 pages.
"VIPS Introduces MCSource to Managed Healthcare Industry"; 1996, VIPS Healthcare Information Systems News Release, 2 pages.
"Leading Provider of Transaction Card Processing Selects Connect Oneserver Software as a Solution for Advanced Internet Merchant Services: First Data Chooses OneServer as an Application to Deliver the Internet to Banks and Merchants"; 1996, press Release, 4 pages.
"Netscape Announces Netscape Livepayment to Facilitate Internet Commerce"; 1996, Netscape News Release, 4 pages.
"Stream , LitleNet, BBN, and KPMG Announce Industry-Wide Initiative to Enable Wide-Scale Software Electronic Commerce"; 1996, News Release, 6 pages.
"First Data and Netscape Announce Program to Help Businesses Establish Payment-Enabled Web Sites"; 1996, First Data Corporation News Release, 5 pages.
"FDR to Offer HNC Software's Real-Time Fraud Detection: New distribution Agreement to Benefit Card Banks"; 1996, First Data Resources News Release, 3 pages.
"First Data Aligns with CyberCash to Offer New Electronic Coin Service"; 1996, First Data Corporation News Release, 3 pages.
"First Data, First USA Paymentech, GE Capital Invest in First Virtual Holdings"; 1996, First Virtual Holdings Corporation News Release, 3 pages.
"Annual Report of First Data Corporation"; 1998, 3 pages.
"Annual Report of First Data Corporation"; 1999, 2 pages.
"American Express Introduces Automated Money Order Dispenser"; 1991, Professional Check Casher, 1 page.
"Western Union Payment Services, Bidpay and Quick Collect, Online Bill Payment, Online Auction Payments"; http://www.westernunion.com/info/osComparePayment.asp, 2 pages.
"About Western Union: Company History"; http://www.payment-solutions.com/history.html, 2 pages.
"Western Union Money Transfer Services, Send Money Online, Money Orders, Send Telegrams"; http://www.westernunion.com/info/osCompareMoneyMessage.asp, 2 pages.
"Quick Pay: The Convenient and reliable way to receive payments from customers worldwide"; http://www.payment-solutions.com/quickpay.html, 3 pages.
Quick Cash: A safe and reliable way to send funds around the world; http://www.payment-solutions.com/quickcash.html, 1 page.
"Signature Services: Helping financial institutions send funds faster"; http://www.payment-solutions.com/signature.html, 1 page.
"American Express Money Orders, Travelers Cheques Now on Sale"; 1936, Dots and Dashes, 2 pages.
List of Prepaid Services; http://www.westernunion.com/info/osComparePrePaid.asp, 1 page.
"Get your Collect Card"; 1939, Dots and Dashes, 2 pages.
Picture of Bill payment form or advertisement, 1 page.
"NTS Completes Merger with EDS Fleet Services; New First Data Unit Sets Sights on New Markets"; 1996, NTS Press Release, 3 pages.
Transfers require ID made by telephaph; 1895, Tariff Book, 4 pages.
American Greeting Cards Click-Through; 38 pages.
"MoneyZap.com Greeting Card Process Flow"; 2000, 2 pages.
"Western Union/Money Zap: Send and receive money easily over the internet"; http://www.moneyzap.com/main.asp, 23 pages.
"Western Union Gift Greetings"; 6 pages.
"PayPal: The way to send and receive money online"; 4 pages.
"Aeromexico and Western Union Partner to Offer a Cash Payment Option for Booking Airline Tickets"; 2004, Press Release, 2 pages.
"Western Union and Continental Airlines Introduce New Quick and Easy Cash Payment Option When Booking Flights"; 2004, Press Release, 4 pages.
"Purchasing American Airlines Tickets Just Got Easier"; 2004, Press Release, 4 pages.
"LAN Airline Carriers and Western Union offer Travellers Additional Payment Options"; 2005, Press Release, 3 pages.
"Western Union Financial Services, Inc.: Benefits Quick Cash Agreement and Disclosure Statement"; 1998, 2 pages.
"Western Union Financial Services, Inc.: Cash Card Agreement and Disclosure Statement"; 1998, 2 pages.
"Federal Benefits Checks are Going Away-Don't Let Your Customers Go with Them: Announcing the Western Union Benefits Quick Cash Program"; 4 pages.
"Introducing the Western Union Cash Card Program"; 1998, 2 pages.
"Western Union Creates Phone Card with BLT Technologies"; 1997, PR Newswire Association, 2 pages.
"AT&T Wireless to Offer Western Union SwiftPay as Replenishment Option for AT&T Free2Go Wireless Prepaid Customers"; 2001, PR Newswire Association, 2 pages.
"New Western Union SwiftPay Service Continues Expansion of Consumer-to-Business Payment Options"; 1999, PR Newswire Association, 2 pages.
"Western Union SwiftPay Selected by Sheakley Uniservice to Complete W-2 Reprint Transactions"; 2000, PR Newswire Association, 2 pages.
"Rhode Island becomes First State to Accept Child Support Payments at Western Union: More that 50 Western Union Convenience Pay Agent Locations Offer New Level of Convenience to Rhode Island Residents Who Pay Child Support"; 2002, Press Release, 3 pages.
"Rhode Island becomes First State to Accept Child Support Payments at Western Union: Government Payment Leader govONE Solutions Adds Walk-in to Full Suite of Payment of Payment Options"; 2002, Press Release, 3 pages.
"SBC Communications Adds Western Union Locations for Walk-In Customer Bill Payments"; 2005, Press Release, 2 pages.
"Western Union Money Orders More Popular Than Ever": 1942, Dots and Dashes, vol. 18, No. 3, 2 pages.
"Refund of Money Transfers"; 1913, Journal of the Telegraph, 2 pages.
Western Union Credit Card; 1915, 4 pages.
How money by phone was paid;; Money Transfer Service: Book of Rules and List of Offices; 1926, Western Union Telegraph Company, 3 pages.
"Pilgrims Started Thanksgiving Custom"; Dots and Dashes, vol. IV, No. 11, 2 pages.
"The Yellow Blank is Correct for every social need"; 1930, Western Union Booklet, 2 pages.
"Last of the Pony Express Riders Tells His Story"; 1932, Dots and Dashes, vol. 8, No. 10, 2 pages.
"Nation Receives Time Over Western Union Network"; 1931, Dots and Dashes, vol. 7, No. 5, 2 pages.

"Collect your delinquent accounts by Telegraph"; 1933, Form 1229-A, 1 page.
"Reynolds Arcade was Western Union Birthplace"; 1993, Dots and Dashes, vol. 9, No. 8, 2 pages.
"Messenger Work Full of Adventure, Excitement"; 1993, Dots and Dashes, vol. 9, No. 11, 2 pages.
Shopping Order service and gift service; 1934, Western Union Telegraph Company, Money Order Book, 6 pages.
Money Orders by Phone; 1935, Fortune Magazine, 3 pages.
"The Yellow Blank: When, Why, How to Use It"; 1934, 5 pages.
Money Order with confirmation; 1948, 1 page.
"Western Union Products and Services: a brief description"; 1960, 22 pages.
Survey of services; 1960, pp. 2-31.
Western Union News Supplement: Automatic travelers checks using Western Union; 1975, 2 pages.
Western Union New Supplement: Money Orders delivery through Mailgram: 1975, 2 pages.
Candygram payment service, 1 page.
Remittance for order sent via Western Union; 1933, 2 pages.
Western Union Telegraph Company; 1933, Money Order Message.
Gift: Money Order for something you really want; 1933, 1 page.
Holiday Greeting by Western Union; 1933, 1 page.
Western Union Money Transfer, Form 72-A, 1933, 1 page.
Western Union Foreign Transfer Order, Form 72-A, 1933, 1 page.
Western Union Domestic Transfer Order, Form 72-A, 1933, 1 page.
Western Union Gift Orders: A Practical Answer to the Christmas Gift Problem, 1933, 1 page.
Western Union Gift Orders: The Sensible, Convenient Way to take care of your Christmas Shopping; 1933, 1 page.
Shopping Order by Western Union, 1933, 1 page.
Western Union Shopping Order, 1933, 2 pages.
Western Union Hotel-Motel Reservation Service, 1 page.
bidpay.com: Whois search results; 2003, http://www.networksolutions.com/en_US/whois/results.jhtml;jsessionid+VZDZVYDD1J, 2 pages.
"billserv.com Launches bills.com, an internet Portal for Consumers to Pay All Bills Online at No Cost"; 2000, Business Wire, 2 pages.
First Data Acquires PaySys International; 2001, Press Release, 2 pages.
Luxury Brands LLC: WOrld Famous Brands at Liquidation Proces; http://www.auctionbytes.com/cab/pages/payment, 3 pages.
PayPal for the Palm; http://handheldnews.com/file.asp?ObjectID=5401, 2 pages.
PayPal.com Case Study; http://fox.rollins.edu/-slackman/PayPal.htm, 2003, 7 pages.
PayPal-News; http://www.ndrys.com/paypal.html, 2003, 3 pages.
Hoffman, Karen Epper; "PayPal Still Running Free"; 2003, Bank Technology News, 3 pages.
Latour, Almar; "PayPal Electronic Plan May be on the Money in Years to Come"; 1999, The Wall Street Journal, 2 pages.
Plotkin, Hal; "Beam Me up Some Cash"; 1999, Silicon Valley Insider, 3 pages.
Boneh, Dan: "Beaming Money by Email is Web's Next Killer App"; 1999, PR Newswire, 4 pages.
BidPay: Seller FAQs—Receiving Payments and Using the Money Order Service; 7 pages.
Steiner, Ina: "BidPay.com Offers Click and Pay Service for buyers"; 2000, Auction Bytes, 4 pages.
Steiner, Ina: "Follow-up to BidPay Article"; 2000, Auction Bytes, 3 pages.
Steiner, Ina: "PayPal Online Payment Service—Another Way to Pay for Auction Items"; 2000, Auction Bytes, 4 pages.
Steiner, Ina: "Accepting Credit Cards When You Sell Items: ProPay and Billpoint Payment Services"; 2000 Auction Bytes, 4 pages.
Wermer, Sandra; "A million credit card transactions in five hours"; 1997, Primeur, 2 pages.
"PaySys signs up four Asian distributors"; 1997 Orlando Business Journal, 3 pages.
Products and Services for PaySys, 2 pages.
VisionPLUS Consumer Payment Solution Overview, 2 pages.
PaySys—company overview, 2 pages.
State of New York Banking Department: Staff Letters and Memoranda; 2000, http://www.banking.state.ny.us/Io000718.htm, 2 pages.
Wijnen, Rene; You've Got Money!; 2000, Bank Technology News, vol. 13, No. 6, 4 pages.
"Beaming Money by Email is Web's Next Killer App", PR Newswire, New York, Nov. 16, 1999, p.1.
"billserv.com Launches bills.com, an Internet Portal for Consumers to Pay all Bills Online at no Cost", Business Editors & High-Tech Writers. Business Wire, New York, Feb. 22, 2000, p. 1.
AMERINET, INC., "Debit-It!—The Best Idea In Payment Systems Since the Credit Card", downloaded from website http://www.debit-it.com./ on Feb. 7, 2000, 8 pages.
Business Wire, "E-Commerce, Email and E-greeting Cards Combine in New Web Site Designed by Interactive Bureau", Sep. 14, 1999 (abstract), [online] [retrieved on May 1, 2002], retrieved from PROQUEST Database, 2 pages.
Business Wire, "E-Commerce, Email and E-greeting Cards Combine in New Web Site Designed by Interactive Bureau; Flooz.com Features a Fun Online Gift Currency You Send by Email for Any Occasion", downloaded from website http://www.proquest.umi.com.
CONFINITY, INC., *PayPal.com, How PayPal.com Works*, downloaded from website http://www.paypal.com on Feb. 7, 2000, 7 pages.
DOTBANK, *The Way to Send and Receive Money on the Internet*, downloaded from website http://www.dotbank.com, Feb. 7, 2000, 6 pages.
http://www.vfi-finance.com/tranz330.htm, Tranz 330 Fast, Low-Cost Transaction Automation At The Point Of Service, VeriFone Finance, Jan. 1999, pp. 1-3, especially pp. 1-2.
Idealab Company, PayMe.com, downloaded from website http://ssl.idealab.com on Feb. 16, 2000, 7 pages.
Intell-A-Check Corp.: "Intell-A-Check!-The Way to get Paid", Intell-A-Check product overview, retrieved from http://www.icheck.com/ on Feb. 7, 2000, 7 pages.
Karpinski, R. "Web Merchants Try Debit Cards and Gift Certificates to Spur Sales" InternetWeek, Oct. 11, 1999, 2 pages.
New commercial services from Western Union.allow businesses to directly transfer money internationally; User companies can now send or receive money at their own offices through on-line connection to world's largest international money transfer network. Business Wire. Oct. 16, 1995, p. 1.
Russo, R. "Omaha's Giftpoint.com Draws $5 Million Investment", Omaha World, Dec. 14, 1999, 2 pages.
PR Newswire, "GiftSpot.com Simplifies Gift-Giving on the Internet," Oct. 20, 1999 (abstract), [online] [retrieved on May 1, 2002], retrieved from PROQUEST Database, 5 pages.
TeleCheck Internatonal, Inc.: "Making Checks Our Responsibility", retrieved from http://www.telecheck.com/home/home.html on Feb. 7, 2000, 8 pages.
TRANSPOINT, "The Way to Pay Online", downloaded from website http://www.transpoint.com/ on Feb. 10, 2000, 12 pages.
Walker, L. "Click a Card", The Washington Post, Dec. 16, 1999, 3 pages.
Website "eCount" at http://www.ecount.com.
Website: "Billpoint" at http://www.billpoint.com.
Website: "eMoneyMail" at http://www.emoneymail.com.
Website: "I-Escrow" at http://www.iescrow.com.
Website: "PayMe.com" at http://www.payme.com.
Website: "PayMyBills.com" at http://www/paymybills.com.
Website: "PayPal" at http://www.paypal.com.
Website: "Tradesafe.com" at http://www.tradesafe.com.
Wijnen, Rene "You've Got Money!", Bank Technology News, New York, Jun. 2000, vol. 13, Issue 6, p. 1.
http://news.firstdata.com/media/ReleaseDetail.cfm?ReleaseID=849995>.
Quick Collect; Government/Child Support Agency Name, Training Guide; 2004, 7 pages.
"Quick Cash and Quick Collect: Western Union'money-movers"; 1990, *Newsbriefs*, vol. 2, No. 1, 3 pages.
Your sending more than a payment: Point-of-Sale & Merchandising Support Advertising Materials, 2 pages.

"Your sending more than a payment: You're sending peace of mind"; 2004, 3 pages.
"Send Your Utility Bill Payment from Here!"; 4 pages.
"Annual Report of the President of the Western Union Telegraph Company"; 1873, 11 pages.
"First located example of a money transfer"; Aug. 25, 1873, 2 pages.
"Annual Report of the President of the Western Union Telegraph Company"; 1874, 11 pages.
"The Western Union Telegraph Company: Rules for Money Transfer Service"; 1908, 25 pages.
"The Western Union Telegraph Company: Delivery Department Instructions"; 1926, Commercial Bulletin No. 9-A, 4 pages.
"The Western Union Telegraph Company:Instructions for Receiving Clerks"; 1929, Commercial Bulletin No. 37-A, 3 pages.
"Annual Report of the Western Union Telegraph Company"; 1940, 3 pages.
"Annual Report of the Western Union Telegraph Company"; 1947, 3 pages.
"Annual Report of the Western Union Telegraph Company"; 1949, 3 pages.
"Annual Report of the Western Union Telegraph Company"; 1951, 5 pages.
"Annual Report of the Western Union Telegraph Company"; 1974, 9 pages.
"Annual Report of the Western Union Telegraph Company"; 1978, 2 pages.
"Annual Report of the Western Union Telegraph Company"; 1990, 4 pages.
"Strean, LitleNet, BBN, and KPMG Announce Industry-Wide Initiative to Enable Wide-Scale Software Electronic Commerce"; 1996, News Release, 6 pages.
"Annual Report of First Data Corporation"; 1998, 3 pages.
"Annual Report of First Data Corporation"1999, 2 pages.
"About Western Union: Company History"; http://www.payment-solutions.com/history.html, 2 pages.
"LAN Airline Alliance Carriers and Western Union offer Travellers Additional Payment Options"; 2005, Press Release, 3 pages.
"Pilgrims Started Thanksgiving Custom"; Dots and Dashes, vol. 9, No. 11, 2 pages.
"Western Union Products and Services: a brief description"; 1960, 21 pages.
Survey of services; 1960, 15 pages.
Gift: Money Order for something you really want: 1933, 1 page.
"billserv.com Launches bills.com, as internet Portal for Consumers to Pay All Bills Online at No Cost"; 2000, Business Wire, 1 page.
PayPal.com Case Study: http://fox.rollins.edu/~slackman/PayPal.htm, 2003, 7 pages.
BidPay: Buyer FAQs—Receiving Payments and Using the Money Order Service; 7 pages.

* cited by examiner

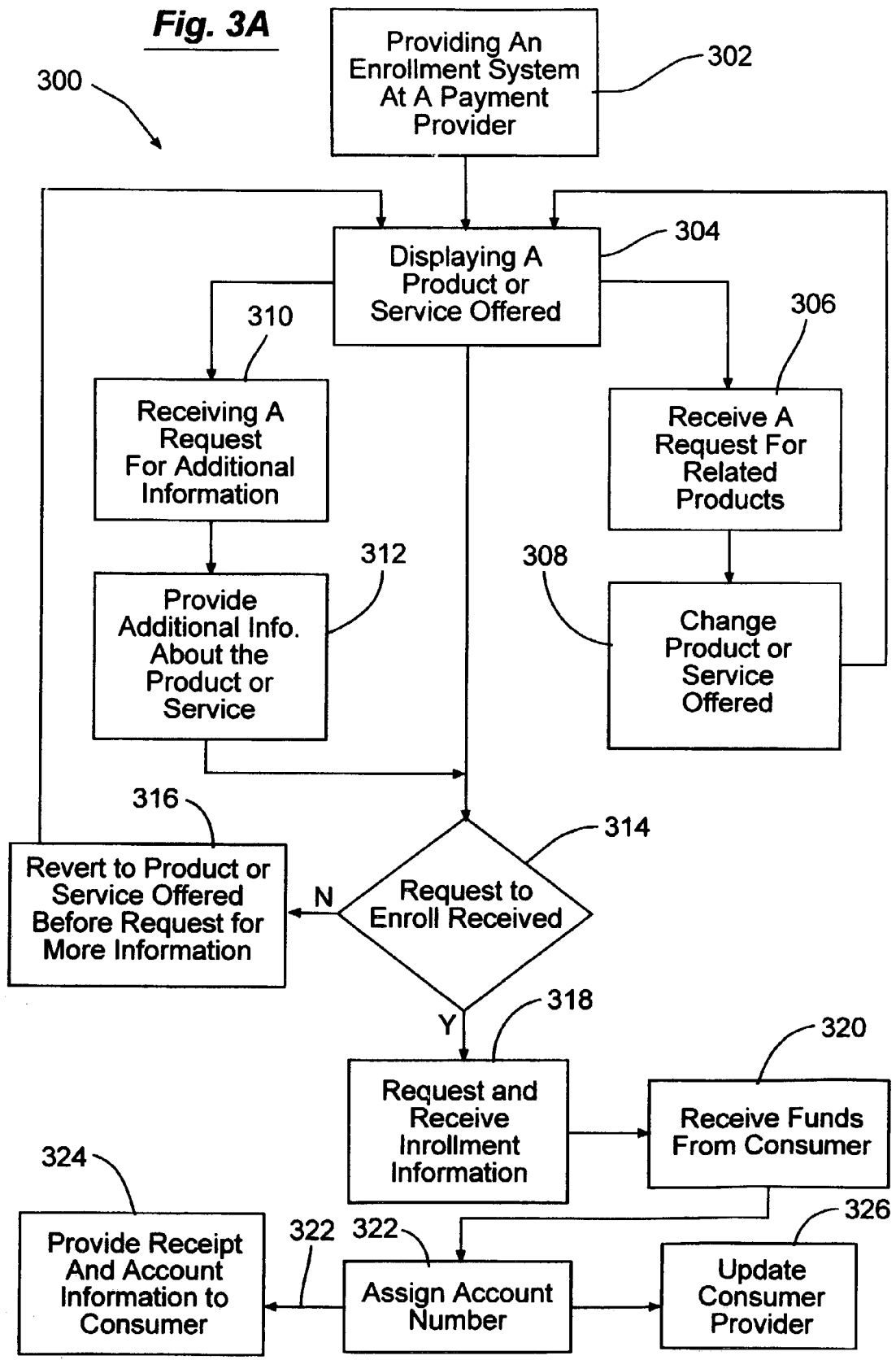

SYSTEMS AND METHODS FOR ENROLLING CONSUMERS IN GOODS AND SERVICES

CROSS-REFERENCES TO RELATED APPLICATIONS

This application is a continuation in part application and claims the benefit of U.S. application Ser. No. 10/007701, filed Dec. 10, 2001, the complete disclosure of which is herein incorporated by reference. The aforementioned application is a continuation in part of U.S. application Ser. No. 09/823,697, filed Mar. 31, 2001, and U.S. application Ser. No. 09/990,702, filed Nov. 9, 2001, the complete disclosure of which is also herein incorporated by reference.

BACKGROUND OF THE INVENTION

The present invention relates generally to financial transaction systems and methodologies, and in particular to methods and systems for enrolling consumers in goods and services offered by third party providers.

Providers of goods and services spend a great deal of time and effort enrolling consumers to use the offered goods and services. Such can include advertising, telemarketing, and the like. While such approaches can be effective, they often fail to attract or even identify the desired consumer. Further, such approaches are often cumbersome and require significant effort to gather appropriate information from consumers. In addition, such an approach can require the active involvement of the provider in the enrollment process, which in some cases it is not capable of adequately supporting in an efficient and cost effective manner.

Therefore, there is a need in the art for solutions to address problems associated with enrolling consumers in goods and services of various providers. Hence, among a number of other advantages apparent from the following description, the present invention provides systems and methods for addressing such problems.

BRIEF SUMMARY OF THE INVENTION

Among other things, various aspects of the present invention relate to providing enrollment services for one or more consumer providers. Yet other of the aspects of the present invention relate to providing enrollment services in relation to payment acceptance services. These and other aspects are more fully developed in the detailed description below.

In one embodiment of the present invention, a method is provided for enrolling a consumer with one or more consumer providers. The method includes providing an enrollment system. Such an enrollment system including an entry device, a display screen, and a memory. Information associated with a good or service available from a consumer provider is maintained in the memory. One or more enrollment options including at least a portion of the aforementioned information is displayed via the display screen. A request is received to enroll from a requester and the requester is enrolled in the good or service.

Other embodiments include providing enrollment options from more than one consumer provider. Further, various embodiments include providing enrollment options for more than one product from a particular consumer provider. Yet further, some embodiments include providing multiple enrollment options from multiple consumer providers.

In some embodiments, various levels of information can be accessed in relation to one or more enrollment options. In one particular embodiment, some of the information offered can be provided by a third party apart from either the payment provider or the consumer provider.

Various embodiments include assignment of an account number to a requester and providing the account number to the requester. In this way, the requester can access the account information by contacting the consumer provider directly. In particular embodiments, the assigned account number is inchoate and is subsequently activated by contacting the consumer provider.

In various embodiments, payment is received in exchange for a good or service forming the basis of the enrollment. The payment, or a portion thereof, can be electronically transmitted to the consumer provider offering the good or service.

Other embodiments of the present invention include a system for enrolling a consumer with one or more consumer providers. The system includes an enrollment device with an entry device, a display screen, a processor, and a memory. The memory contains information associated with a good or service available from a consumer provider. In addition, the memory includes instructions executable by the processor to display at least one enrollment option incorporating at least some of the aforementioned information. In addition, the instructions are executable to receive a request for enrollment from a requester and to process the request for enrollment.

Yet another embodiment of the present invention is a method for enrolling a consumer with one or more consumer providers. The method includes providing an enrollment system with an entry device, a display screen, and a memory. The memory contains information associated with a first and a second good or service available from a first consumer provider, and a third good or service available from a second consumer provider. The method further includes displaying one or more enrollment options comprising at least some of the aforementioned information, and receiving a request for enrollment from a requester. It is determined which of the offered goods or services is associated with the request for enrollment and the requester is enrolled in the good or service.

The summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIGS. 3A–3B are flow diagrams for enrolling consumers in accordance with embodiments of the present invention;

DETAILED DESCRIPTION OF THE INVENTION

Various detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Among other things, the present invention provides systems and methods for accepting payments for goods and/or services offered by a third party provider. In addition, the present invention provides systems and methods for enrolling consumers in goods and/or services provided by a third party provider. As further discussed below, such third party providers are referred to herein as "consumer providers" and those accepting payments and providing enrollment services are referred to as "payment providers".

Figure 1A:
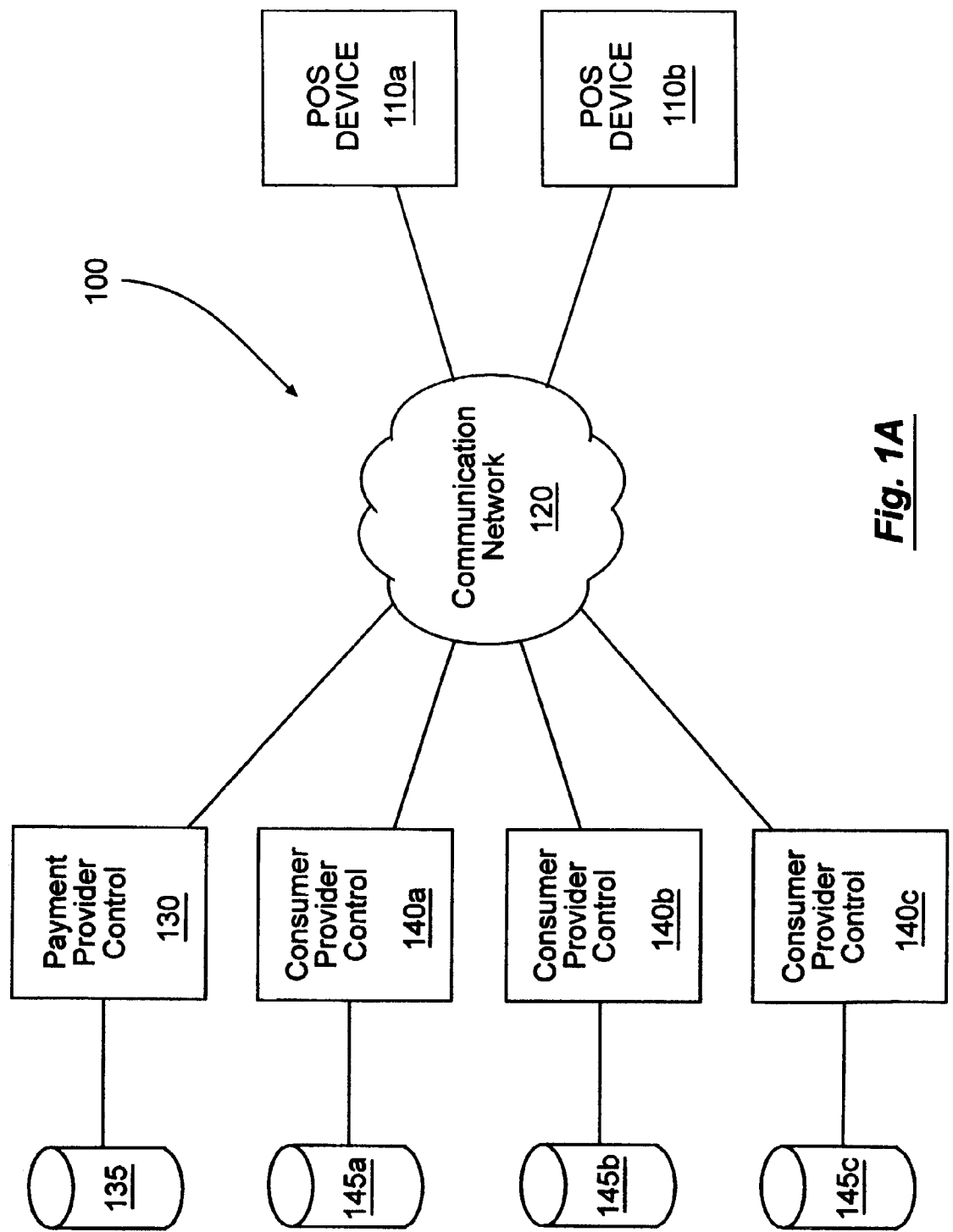
FIGS. 1A–1B are schematic diagrams of payment service and/or enrollment systems in accordance with embodiments of the present invention.

Referring to FIG. 1A, an enrollment and payment system 100 is illustrated that may be used to facilitate payments made to purchase goods or services, and/or provide enrollment services in accordance with an embodiment of the present invention. System 100 includes a point-of-sale ("POS") device 110 in communication with a payment provider control 130 via a communication network 120. In addition, payment provider control 130 is communicably coupled to one or more consumer provider controls 140 via communication network 120. Payment provider control 130 is associated with a payment provider database 135 and consumer provider controls 140 are associated with consumer provider databases 145. As will be evident from the proceeding discussion, system 100 can include any number of POS devices 110 and consumer provider controls 140 in accordance with the various embodiments of the present invention.

POS device 110 can be any device disposed at the point-of-sale. Thus, POS device 110 can one such as is described in copending U.S. patent application Ser. No. 09/634,901, entitled "POINT OF SALE PAYMENT SYSTEM", filed Aug. 9, 2000 and U.S. Prov. Appl. No. 60/147,899, entitled "INTEGRATED POINT OF SALE DEVICE", filed Aug. 9, 1999, both of which are incorporated herein by reference for all purposes. Based on the description provided herein, one of ordinary skill in the art will recognize other devices capable of operating as POS device 110. For example, POS device 110 can be a personal computer ("PC"), a personal digital assistant ("PDA"), or the like.

As used herein, a consumer provider is any entity that offers goods and/or services for sale to consumers. Further, such consumer providers maintain consumer provider controls 140 to maintain accounts and other information related to the consumers that they serve. Such consumer provider controls 140 can be any type of computer capable of communicating with other types of communication devices or computers. For example, consumer provider control 140 can be a mainframe computer, such as those available from Tandem, a server computer, or the like.

In some cases, consumer providers are incapable of, or choose not to accept payments directly from consumers, or a particular group of consumers. Thus, in some instances, a consumer provider may desire to out source payment services to a payment provider. Alternatively, a consumer provider may accept payments from consumers with good credit, while it may desire to out source payment acceptance for consumers with poor credit to a payment provider. As yet another alternative, a consumer provider may accept non-cash payments directly, while deferring cash collections to be handled via a payment provider. Some examples of consumer providers include, but are not limited to, a phone company, an electric company, a credit card company, and the like.

Thus, for whatever reason, a consumer provider may choose to utilize a payment provider to collect payments and/or enroll consumers on its behalf. Thus, as used herein, a payment provider is any entity that is capable of accepting payments from consumers and/or enrolling consumers, and crediting the accepted payments to the appropriate consumer provider. In some cases, a payment provider is an entity that provides both POS device 110 and payment provider control 130. In other cases, a payment provider is an entity that provides payment provider control 130, and accepts inputs from POS devices 110 operated by third parties. In yet other cases, a payment provider is an entity that provides POS device 110 that interacts directly with consumer provider controls 140 without utilizing payment provider control 130. Further, in some cases a payment provider can also be an enrollment provider, where the payment provider not only accepts payments destined for the consumer provider, but also enrolls consumers in the goods and/or services of the consumer provider. In yet other instances, a payment provider can provide only enrollment and not payment acceptance services.

In some embodiments of the present invention, consumer providers 140 issue unique identifiers which are associated with a good or service that are electronically transmitted to payment provider control 130, where they can be stored in database 135. These identifiers may be associated with specific consumers. For example, when requesting a good or service, the consumer provider may create an account, an identifier is then associated with the account and issued to the consumer. Alternatively, the identifiers may be associated with a good or service, but not to any given consumer. For example, the identifiers may be associated with some type of stored value, such as phone time, dollars and the like. This value may be redeemed simply by presenting the identifier to the consumer provider.

Communication network 120 can be any network capable of transmitting and receiving information in relation to POS device 110, consumer provider controls 140, and payment provider controls 130. For example, communication network 120 can comprise a TCP/IP compliant virtual private network ("VPN"), the Internet, a local area network ("LAN"), a wide area network ("WAN"), a telephone network, a cellular telephone network, an optical network, a wireless network, or any other similar communication network.

In some embodiments, communication network 120 is a combination of a variety of network types. For example, in one embodiment, communication network comprises the Internet for communicating between POS device 110 and payment provider control 130, and a dial-up network for communicating between payment provider control 130 and consumer provider controls 140. In light of this document, one of ordinary skill in the art will recognize a number of other network types and/or combinations thereof that are capable of facilitating communications between the various components of system 100.

Figure 1B:
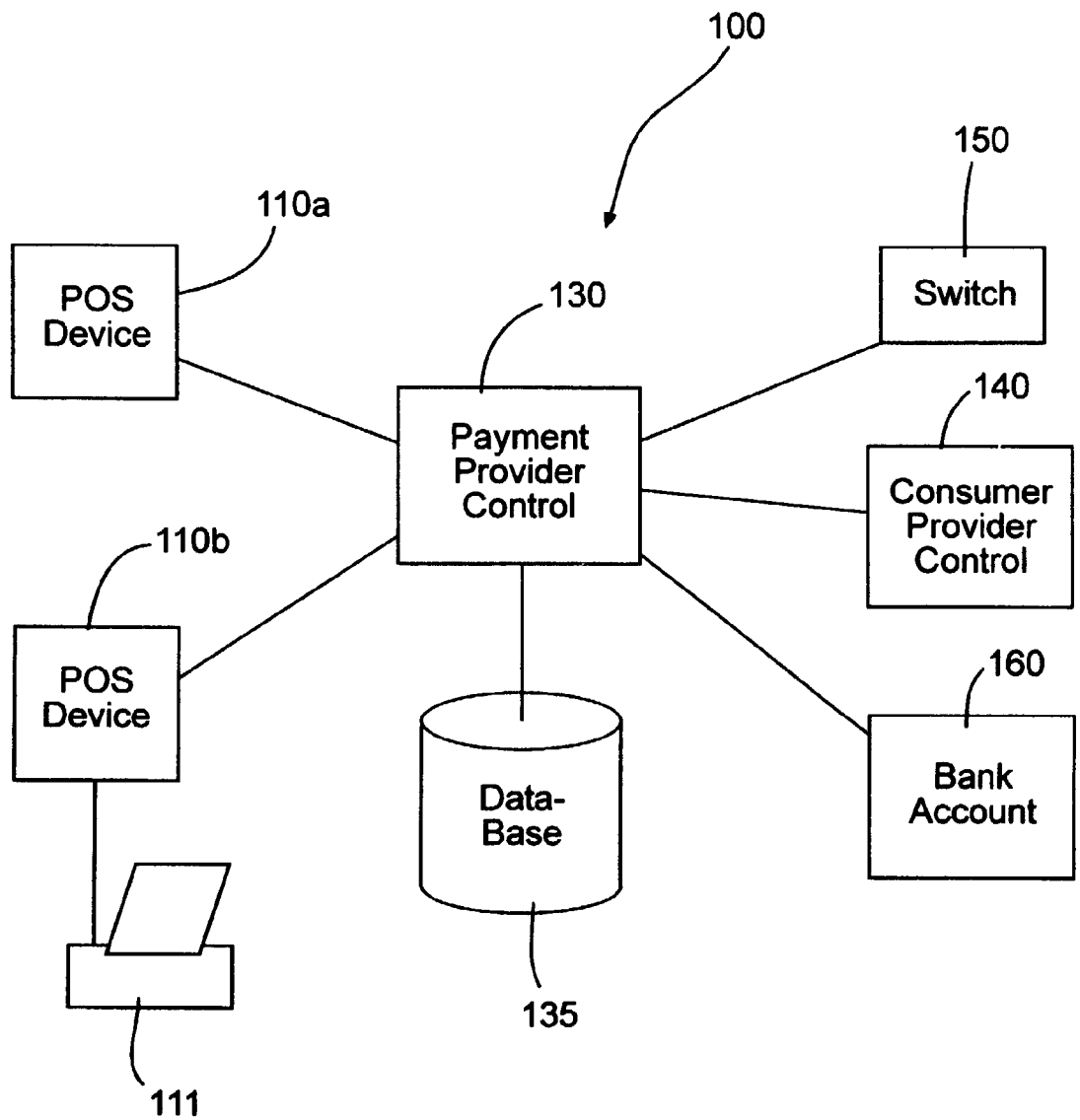

Referring to FIG. 1B, a logical diagram of system 100 of FIG. 1A is illustrated. Central to system 100 is payment provider control 130. In particular embodiments, payment provider control 130 is comprised of a host computer capable of accessing one or more databases 135. Further, payment provider control 130 facilitates data transfer between one or more consumer providers 140 and one or more POS devices 110, or other computer terminals. Payment provider control 130 can be any type of computer capable of communicating with other types of communication devices or computers. For example, payment provider 130 can be a mainframe computer, such as those available from Tandem, a server computer, or the like.

POS devices 110 communicate with payment provider control 130 in order to obtain the identifiers and any associated payment information. For example, when ready to make a payment, a consumer may present their identifier which is entered into POS device 110. This information is transmitted to payment provider control 130 where any relevant information regarding the required payment is transmitted back to POS device 110. For instance, POS devices 110 may present a screen with the identifier and the amount of payment required to receive a good or service from consumer provider 140. In some cases, the consumer may not yet have an identifier and may simply request to purchase a good or service from a consumer provider 140. For instance, the consumer may wish to purchase phone time from a certain phone company. In such cases, the consumer makes a request to purchase phone time from a certain consumer provider 140. This information is entered into POS device 110. POS device 110 may then display payment options for that provider as received from payment provider control 130. For example, payment in increments of $5, $10, $25 and $50 may be accepted. Upon receipt of payment, an identifier is issued to the consumer. Conveniently, a printer 110 may print a receipt with the identifier.

At the time of payment, other funds may also be collected. For example, the payment provider may charge and collect a fee for its services. As another example, applicable taxes may be calculated and collected. These taxes may be calculated by payment provider control 130 in combination with database 135 and may include tax tables for various locations throughout the country. When tendering payment, the consumer may provide information on his residential address, such as a zip code. This information is transmitted to payment provider control 130 that performs a look-up in database 135 to determine the appropriate tax rate. Payment provider control 130 then computes the tax and sends the tax information to computer 308. The payment amount, taxes, and any service fees may then be displayed to the consumer on a display screen. Alternatively, the taxes may be computed directly by POS device 110 and based on the location of POS device 110, or in part by POS device 110 and in part by payment provider control 130.

Upon tendering payment, an electronic record of the payment along with the associated identifier is created and transmitted to payment provider control 130 where it may be stored in database 135. This payment information may also be transmitted to consumer provider control 140 so that the good or service may be provided to the consumer. If the services relate to telecommunications, the payment information may also be sent from payment provider control 130 to a switch 150 to permit the communications service to be promptly provided. For example, if the consumer purchased cell phone time, the consumer provider's switch would receive the payment information and add time to the phone, typically before the consumer leaves the location where payment is made. Of course, the instructions to the switch could also be sent from the consumer provider as well. Receipt of payment information may also trigger the providing of other services, such as service activation, shipping of order goods, and the like. In some cases, the service may not be activated or the order good provided until the consumer contacts the consumer provider and gives the issued identifier. For example, phone time may be purchased, but not activated until the phone company is contacted and given the identifier. When the good is a stored value, this record may be stored in database 135 and transmitted to consumer provider control 140. When a good or service is ordered from a consumer provider, the identifier is presented to the consumer provider control 140 associated with the consumer provider and the stored value account is debited for the purchase price.

Payment provider control 130 may also be used to electronically transfer the payment along with any collected taxes to the consumer provider. This may conveniently occur by an ACH transfer of funds into a bank account 160 of the consumer provider. This may occur upon receipt of the payment information by payment provider control 130 or by batch mode at specified times. A record of the deposit may separately be transmitted to consumer provider control 140. Payment provider control 130 is configured to communicate with a separate ACH system that debits the account of the consumer and credits the account of the consumer provider as is known in the art.

Hence, system 100 provides consumers with an easy way to purchase goods or services. Further, such goods and services are provided in an efficient manner and provides rapid payment to the consumer provider. Another feature of system 100 is that consumer provider may also be provided with access to payment provider control 130. In this way, the consumer provider may do a look-up to see if a payment was posted correctly, to see the status of a payment or the like. Further, regular updates may be sent from consumer provider control 140 to payment provider control 130 so that consumer accounts may be kept current.

In yet other instances, system 100 can be used to enroll consumers in products and/or services offered by one or more consumer providers. In such a situation, POS device 110 can display product offerings associated with one or more consumer providers. Such information can be obtained from payment provider control 130. Further, POS device 110 can gather enrollment information and payments for enrollment, and based on information provided by payment provider control 130, can provide consumers with activated accounts for goods and services provided from a particular consumer provider. These and other features of system 100 are discussed in greater detail below.

Figure 2:
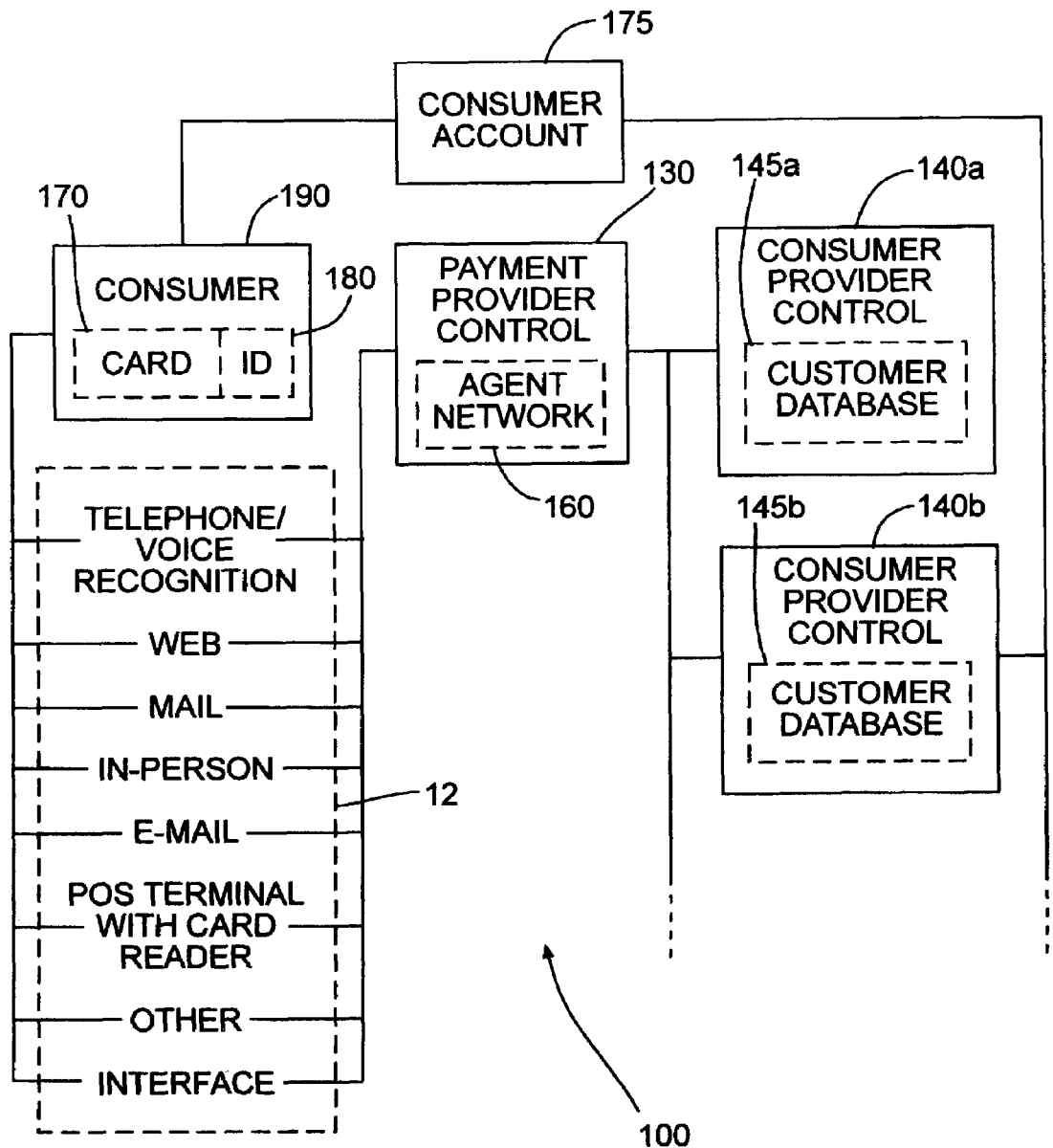
FIG. 2 is a logical diagram of a payment service and/or enrollment system similar to the systems illustrated in FIGS. 1.

Referring to FIG. 2, another embodiment of system 100 is illustrated including discussion of additional elements. As shown, system 100 includes payment provider control 130 for facilitating payment from a consumer 190 to one or more consumer providers represented by consumer provider controls 140.

Each consumer 190 has a unique ID 180, which can comprise any suitable identifier. Conventional identifiers such as name, social security number, PIN, etc. are acceptable. Moreover, system 100 can accommodate anonymous consumers 190. Such consumers 190 can maintain their anonymity by creating their own IDs 180. ID 180 can also comprise the consumer's telephone number. Thus, system 100 can be used for paying for telephone services using only the telephone number of consumer 190 for identification purposes. Consumer 190 in this embodiment does not even have to provide an address or any other personal information. Similar identification arrangements could be used with other consumer providers (e.g., accepting payments on accounts with the consumers identified by their respective account numbers). Consumer 190 interfaces with payment provider control 130 through an interface 12. Interface 12 can comprise any suitable form or device for communications, including telephone (which can incorporate voice recognition (VR)), worldwide web (Internet), mail, in-person, a point-of-sale (POS) terminal with a card reader, e-mail or any other suitable interface. As with the previous embodiments, Interface 12 can be a POS device 110. Further, in some embodiments, such a POS device 110 can be installed at a retail outlet unrelated to any of various consumer provider controls 140 and/or payment provider controls 130 accessible via system 100.

In this particular embodiment, payment provider control 130 includes an agent network 160, where agents in the network provide POS devices 110 at locations accessible to consumer 190. Payment provider control 130 maintains consumer provider accounts 175 which can correspond to the various consumer providers represented by consumer provider controls 140. Each consumer provider control 140 can have associated therewith a database 145 containing pertinent information regarding the consumers 190 and their respective accounts. The designation of accounts, sub-accounts, master accounts, etc. can vary from consumer provider to consumer provider. Thus, as used herein the terms account, sub-account and similar terms can designate either the entire account base of a particular consumer provider control 140, or the individual account of consumer(s) 190.

In one embodiment, agent network 160 comprises a host computer (not shown) that may be accessed by a variety of remote computers or other devices, such as those described in connection with interface 12. For example, the host computer may comprise a mainframe computer, a server computer, or the like. A database may also be associated with the host computer. In this way, information from consumer databases 145 may be transmitted to the host computer and stored in the database. When a consumer 190 contacts agent network 160, it may be through the host computer. Hence, with this configuration, a consumer may proceed with a transaction using interface 12 which contacts the host computer of agent network 160 to receive consumer information, such as the unique identifier, and to transmit payment information back to the host computer. The host computer may also serve to coordinate a wire transfer of the payment to a bank account of the consumer provider as well as to transmit payment information to consumer provider control of the consumer provider. Electronic funds transfers may conveniently be made through an automated clearing house (ACH) system that is contacted by the host computer. ACH transfers are well known within the art and will not be described further.

FIGS. 2–14 illustrate a variety of methods in accordance with the present invention and to which embodiments of system 100 can be applied. It should be recognized that in various of the methods, a card 170 can be issued to consumer 190 and include various information relevant to consumer transactions. Card 170 can be used to facilitate payments via POS device 110. More particularly, card 170 can include a magnetic stripe that can be swiped through a card reader associated with POS device 110 and used to identify consumer 190 to system 100. Either alternatively or in addition, card 170 can comprise a reloadable/stored value card, a credit card, a debit card, or the like. Thus, any suitable card configuration can be utilized. For example, preprinted cards with concealed consumer IDs 180 can be inventoried with the agent network 160 for distribution upon enrollment of consumers 190. However, system 100 can function without any cards whatsoever. In such embodiments, system 100 can function by assigning unique consumer IDs 180 for purposes of conducting all payment transactions.

Referring to FIG. 3A, a flow diagram 300 illustrates a method in accordance with the present invention of enrolling consumers to purchase goods and/or services offered by a consumer provider. As illustrated, the method can be implemented by a payment provider utilizing payment provider control 130 in communication with POS device 110. Following flow diagram 300, an enrollment system is provided at a payment provider (block 302). Such an enrollment system can include a POS device 110 capable of communicating with either or both of a payment provider control 130 and a consumer provider control 140.

Thus, for example, in some embodiments, POS device 110 can act to enroll consumers, while directly accessing consumer provider control 140 associated with the consumer provider offering the good or service into which the consumer is being enrolled. Alternatively, in some embodiments, POS device 110 acts to enroll consumers by accessing payment provider control 130. Payment provider control 130 is enabled with information from consumer provider control 140 sufficient to allow enrollment of consumers in goods and/or services offered by the consumer provider associated with consumer provider control 140. For simplicity, flow diagram 300 is described in relation to a system where a POS device 110 communicates with a payment provider control 130. Based on this description, one of ordinary skill in the art will appreciate how to implement such an enrollment system, where POS device 110 communicates directly with consumer provider control 140.

Providing the enrollment system can include selling a POS device 110 to a merchant and enabling the merchant to consummate enrollment transactions via POS device 110. In other embodiments, providing the enrollment system can include a merchant purchasing an off-the-shelf solution to act as POS device 110, associating the merchant with a payment provider, and enabling the off-the-shelf solution to consummate enrollment transactions. This is a particularly useful approach where the off-the-shelf solution is a PC, or the like. Enabling the merchant to consummate enrollment transactions can include providing software for execution on POS device 110 and/or access identification codes to the merchant.

Goods and/or services offered by one or more consumer providers can be displayed via a display associated with POS device 110 (block 304). In some embodiments, goods and services available from a particular consumer provider are displayed on a series of integrated display screens, while goods and services from another consumer provider are displayed on another series of integrated screens. Thus, a consumer can navigate the offerings by first selecting a consumer provider. In one particular embodiment, directly competing products are not displayed via the same POS device 110.

In other embodiments, related goods and services, even directly competing goods and services, are displayed on a series of integrated display screens. Thus, a consumer can navigate the offerings by selecting a particular type of good or service. For example, a consumer may request to view all cell phone service providers. From a series of displays providing information associated with the available cell phone providers, a consumer can identify and select a consumer provider and product thereof that best matches the consumer's needs and price constraints.

In particular embodiments, a consumer may request information about other goods or services related to the previously displayed good or service. This request is received by POS device 110 (block 306), and another related good or service can be obtained (block 308) and displayed on POS device 110 (block 304). Information about related goods and services can be obtained by accessing payment provider control 130 via network 120. This process of requesting related goods and services can be repeated until no additional goods or services remain for display. Any relationship can be devised for choosing the next related good or service for display. For example, another good or service offered by the same or a non-competing consumer provider can be displayed. Alternatively, goods and services can be linked by classes, such as, all computer products.

Yet further, the goods and services can be presented in an order that limits the number of directly competing products that are displayed. For example, all products from a particular consumer provider can first be displayed, and only after display of those products are a competing consumer provider's products displayed. Thus, the system provides the ability to display competing products, but only after the consumer provider initially chosen has been exhausted. This acts to protect the brands of consumer providers allowing access through the enrollment system of the payment provider. As yet another alternative, competing products may not be displayed to the same consumer. Thus, while competing products may be available for enrollment through the system, once one product is displayed to a particular consumer, a directly competing product will not be presented to the same consumer. As a more particular example, where a consumer asks to see a good offered by a first consumer provider, a rule set for goods that cannot be shown to the same consumer is implemented, thus preventing the consumer from accessing goods excluded by the rule set.

In some embodiments, the consumer can enter a request for additional information about a particular good or service. This request is received by POS device 110 (block 310), and POS device 110 accesses and displays the requested information (block 312). In some embodiments, this information is provided by accessing payment provider control 130. In other embodiments, this information can be provided by direct access to consumer provider control 140. The information can be that developed by the consumer provider offering the goods or services, or third party information related to the goods or services. For example, the information can be reliability information, such as that provided by consumer reports. As yet another example, the information can be warranty information for a warranty offered by a third party in relation to the good or service. Based on this description, one of ordinary skill in the art will recognize a number of other information types useful in relation to the present invention. Such information can be maintained on database 135 and/or accessed from another source.

After the good or service information is provided, POS device 110 polls to determine if a particular good or service has been requested (block 314). If POS device 110 has remained in an idle or inactive state for a pre-determined period of time, POS device 110 reverts to the originally displayed product and/or entry screen (block 316). This original screen is again displayed via POS device 110 in anticipation of access by a subsequent consumer (block 304).

Where a request to enroll in a particular good or service is received (block 314), POS device displays a request to the consumer for required enrollment information (block 318). As an example, such enrollment information can include the name address and telephone number of a consumer desiring to set up an account with an electric company. It will be appreciated that any level of information can be requested depending upon the type of good or service requested. Further, in some embodiments, POS device 110 provides the capability to automatically populate such information. For example, such information may be maintained on a magnetic stripe card that can be swiped through POS device 110. Alternatively, the consumer may have a previous account with the same or another consumer provider and be known to payment provider control 130. In such a situation, the consumer merely needs to be identified and authenticated to POS device 110, after which any relevant information can be obtained and provided in relation to the present enrollment. Based on this discussion, one of ordinary skill in the art will recognize a number of other possibilities for obtaining enrollment information.

Along with providing the necessary enrollment information, if any, the consumer tenders payment for the good or service (block 320). This payment can be an entire payment for the goods, which can be thereafter sent to an address provided by the consumer, or any other appropriate payment. For example, the payment can be for an initial period of cell phone usage. It should be appreciated that the payment will be in part dictated by the requested good or service and the level of security the consumer provider requires in relation to a particular consumer. Thus, for example, a particular consumer may have very poor credit or no credit, in which case the consumer provider may require full payment prior to supplying the good or service. In some embodiments, payment provider control 130 maintains credit information about consumers, or has the ability to access such credit information from other sources including, but not limited to, consumer provider control 140.

Once the funds have been received (block 320), an account number is assigned to the consumer (block 322). The account number can be obtained from payment provider control 130, or from a block of account numbers previously assigned to POS device 110. The account number can be updated to both the consumer provider (block 326) and to the consumer (block 324). In some embodiments, the account information is provided to the consumer by printing a receipt with the account number, and other related information including payment information thereon. The consumer provider can be updated by providing the enrollment information from the consumer along with the account number from POS device 110 to payment provider control 130. Sometime later, the payment, if any, for the requested good or service is deposited in a bank account associated with the consumer provider.

Figure 3B:
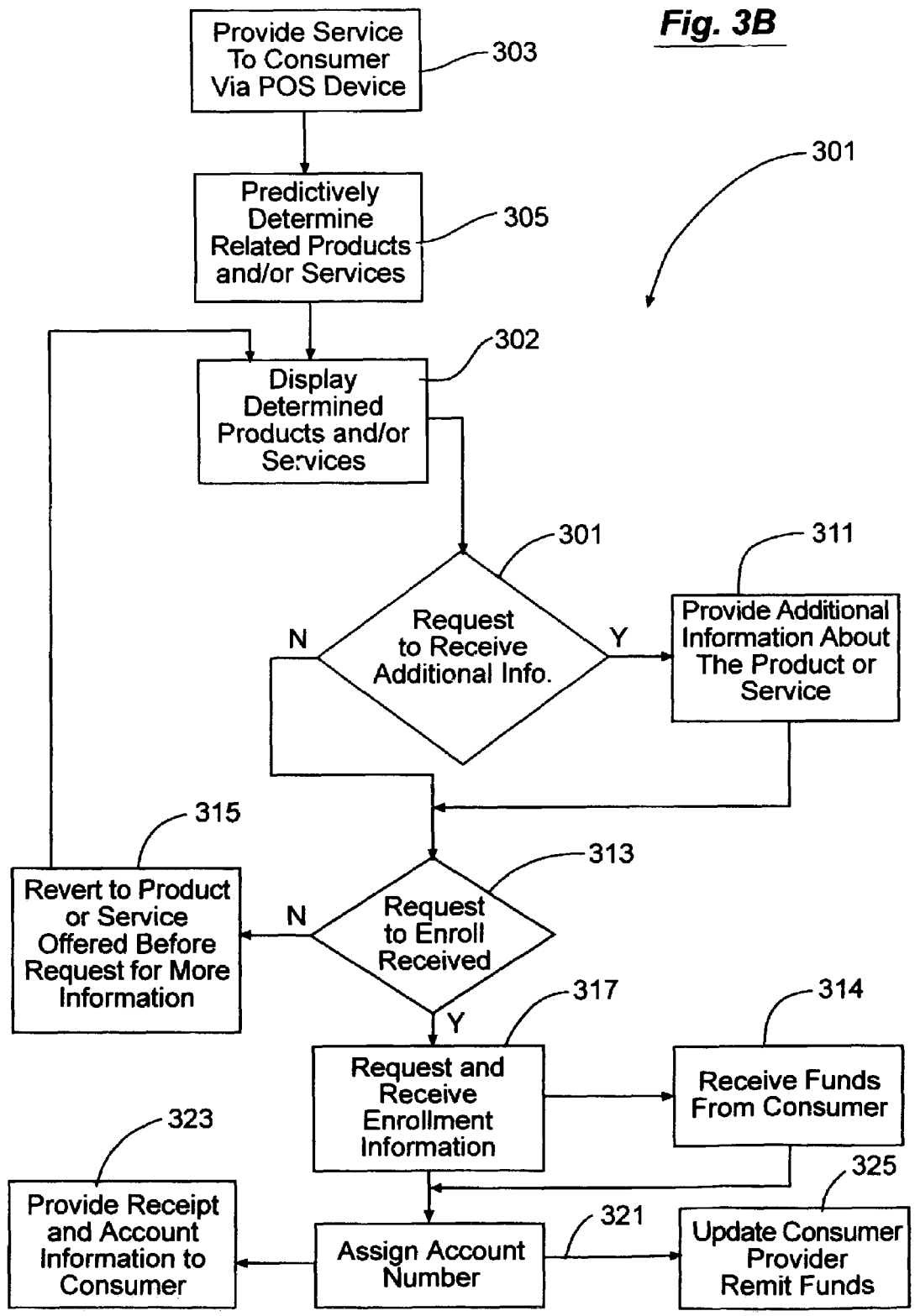

Referring to FIG. 3B, a flow diagram 301 illustrates another method in accordance with the present invention of enrolling consumers to purchase goods and/or services offered by a consumer provider. Following flow diagram 301, a service is provided to a consumer utilizing a POS device 110 at a merchant location (block 303). Such a service can include purchase of a money order, payment of a utility bill, effectuating a money transfer, payment for a good or service offered by the merchant, or the like.

With the consumer interacting with POS device 110, it is predictively determined what type of goods and/or services to market to the consumer (block 305). Such a predictive determination can include identifying goods or services related to the transaction previously performed using POS device 110. For example, the consumer may be purchasing a cell phone, in which case POS device 110 can advertise a cell phone charger to the consumer or cell phone service offered by one or more consumer providers. Alternatively, the consumer may be paying an electric bill, in which case POS device 110 can advertise payment services for local water companies. Yet further, where a driver's license nearing expiration is used to authenticate a transaction, POS device 110 can advertise driver's license renewal services where the consumer provider is the state issuing the driver's license.

As yet another example, where a consumer is setting up service with an electric company, POS device 110 can surmise that the consumer recently moved. In such a circumstance POS device 110 may advertise other services useful to a person that recently moved. For example, POS device 110 can advertise voter registration, enrollment with other utility companies, applications for a driver's license, new license plates, and other similar goods and services.

Alternatively, or in addition, POS device 110 and/or payment provider control 130 may maintain a historical record of transactions performed in relation to a particular consumer. This historical information can be analyzed to determine which goods or services that the consumer would be most likely receptive. Further, the information can be analyzed to determine goods and services for which the consumer is qualified. For example, it may be determined that a consumer consistently purchases a good that is offered in a larger quantity directly from a consumer provider at a reduced price. One of ordinary skill in the art will appreciate a number of other analysis that may be used to predict goods or services to be marketed to a particular consumer.

The determined good or service is displayed to the consumer via POS device 110 (block 307). POS device 110 can then act to enroll the consumer in the determined good or service. In some embodiments, the particular good or service is related to a group of goods and/or services that may also be displayed upon request of the consumer. Thus, the consumer can navigate the offerings by first viewing the determined good or service, and later requesting information about similar or other related goods and services. In one particular embodiment, directly competing products are not displayed. Thus, for example, goods that are directly competitive with the good or service that was the subject of the initial transaction (block 303) may not be presented to the consumer. Again, this helps to maintain brand value associated with various consumer providers offering enrollment via the payment provider.

In some embodiments, the consumer can enter a request for additional information about a particular good or service (block 309). In response to this request, POS device 110 accesses and displays the requested information (block 311). In some embodiments, this information is provided by accessing payment provider control 130. As with the previous embodiment, the information can be that developed by the consumer provider offering the goods or services, or third party information related to the goods or services. Such information can be maintained on database 135 and/or accessed from another source.

After the good or service information is provided, POS device 110 polls to determine if a particular good or service has been requested (block 313). If POS device 110 has remained in an idle or inactive state for a pre-determined period of time, POS device 110 reverts to the originally displayed product and/or entry screen (block 315). This original screen is again displayed via POS device 110 in anticipation of access by a subsequent consumer (block 307).

Where a request to enroll in a particular good or service is received (block 313), POS device 110 displays a request to the consumer for required enrollment information (block 317). Such enrollment information can be similar and gathered in similar fashion to that discussed in the preceding embodiment.

Along with providing the necessary enrollment information, if any, the consumer tenders payment for the good or service (block 319). As with the previous embodiment, this payment can be an entire payment for the goods, which will then be sent to an address provided by the consumer, or any other appropriate payment.

Similar to the previous embodiment, once the funds have been received (block 319), an account number is assigned to the consumer (block 321). The account number can be obtained from payment provider control 130, or from a block of account numbers previously assigned to POS device 110. The account number can be updated to both the consumer provider (block 325) and to the consumer (block 323).

In some embodiments of the methods illustrated in flow diagrams 300, 301 include an additional step of creating a client database. Such a client database can be the database used by a particular consumer provider to account for services and/or products provided in relation to consumers. Further, such a database can include identifiers unique to each of the consumers within the database as well as account balances and credit histories of each of the consumers. Such a database can be formatted for transfer to payment provider control 130. By transferring at least a portion of the information on the database to payment provider control 130, consumers in the consumer provider's database can automatically be enrolled with the payment provider. The consumers can also be notified of the enrollment and directed to the nearest payment provider location(s) at which they can make payments.

Figure 4A:
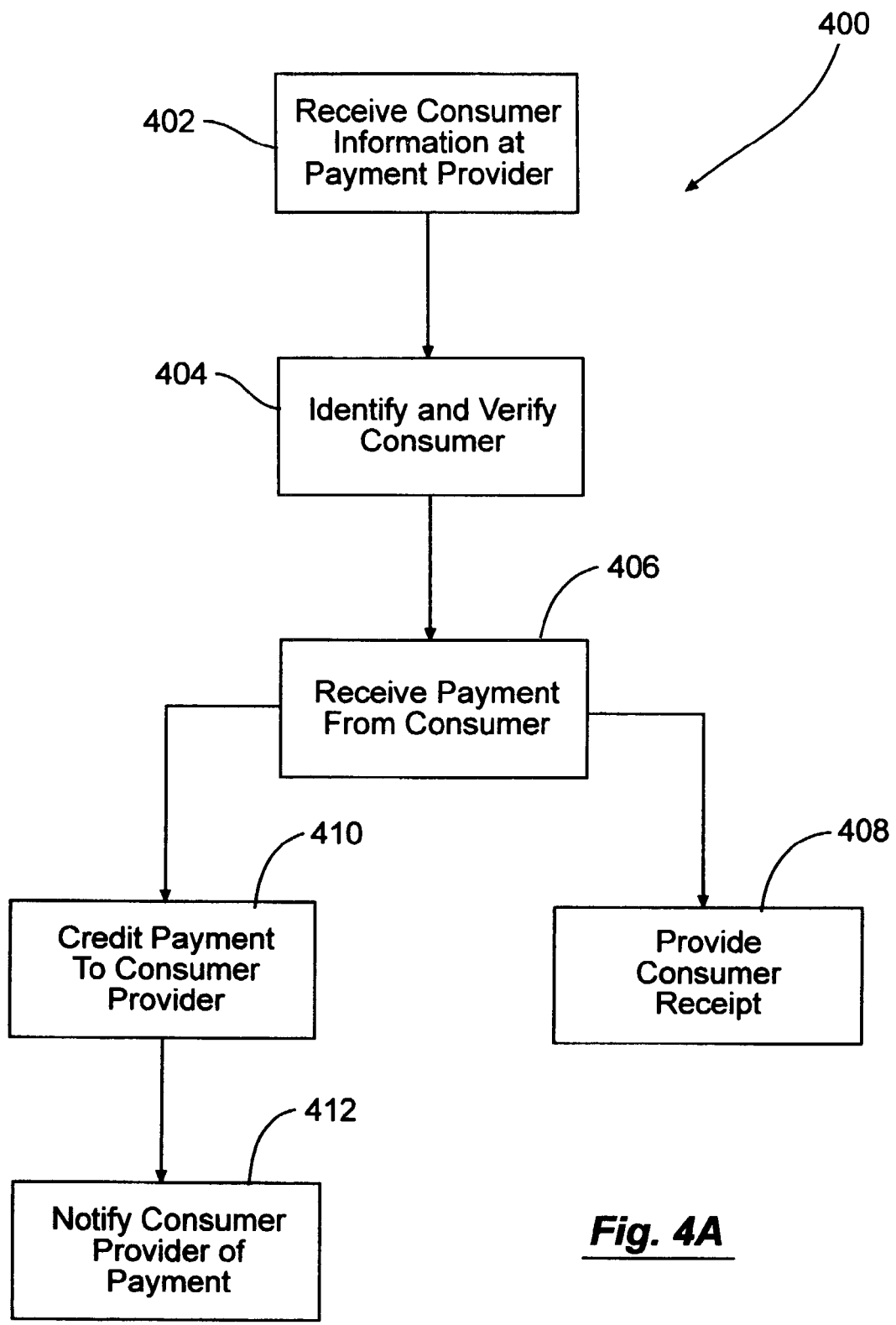
FIGS. 4A–4B are flow diagrams for processing payments in accordance with embodiments of the present invention.

Turning to FIG. 4, embodiments of the present invention can be used, either additionally or exclusively, to accept and process payments in relation to various goods and services provided by consumer providers. Referring to FIG. 4A, a flow diagram 400 illustrates one method of accepting payments in accordance with the present invention. Following flow diagram 400, information about the consumer desiring to make a payment is input to POS device 110 (block 402). Such information can be very minimal, such as, an auction number and payment amount where the consumer desires to remain anonymous. Alternatively, the information can be an identifier previously provided by the consumer provider to identify payments made by the consumer. In other situations, the information can be quite extensive including, but not limited to, the consumer's name, address, telephone number and account number for the account of the consumer provider to which a payment is to be applied. Based on this disclosure, one of ordinary skill in the art will appreciate the information that can be collected from a consumer to make a payment on a particular account.

In some embodiments, the information can be provided to POS device 110 automatically. For example, the information can be entered using a magnetic stripe card reader associated with POS device 110. Alternatively, a small amount of information about the consumer can be entered via a keyboard associated with POS device 130 and the remainder of the information about the consumer automatically populated from database 135 via payment provider 130.

Once the consumer information has been provided, the information is used to identify and verify the consumer (block 404). In some embodiments, this includes displaying the received information via a display associated with POS device 110. The consumer is then expected to review the information for accuracy, and press a key indicating that the information is complete. In other embodiments, identifying and verifying the consumer includes accessing payment provider control 130, and comparing the identification information received from the consumer against information maintained on database 135. The information maintained on database 135 can include account balances for the consumer related to one or more consumer providers, as well as other information.

In one particular embodiment, the consumer is identified and in addition provides a consumer provider identification via POS device 110. This information is transferred to payment provider control 130 via network 120. Payment provider control 130 accesses the account information associated with the consumer and transfers the account information to POS device 110 where it is displayed to the consumer via a display and/or a printed receipt. Thus, in some embodiments, it is possible for a consumer to obtain account information related to one or more consumer providers from a payment provider.

After the consumer is identified and verified, the consumer tenders payment to the payment provider (block 406). This can be done by handing cash to a merchant operating POS device 110, by swiping a credit card through a magnetic stripe card reader associated with POS device 110, by authorizing a bank transfer using POS device 110, or any other method of tendering payment. Once the payment is received, POS device 110 transfers an indication that payment was received and the amount of received payment to payment provider control 130 via network 120. In some embodiments, payment provider control 130 responds via network 120 with an indication that the payment was received. POS device 110 also prints a receipt for the consumer (block 408). The receipt can include a variety of information, such as, the account for which payment was received, the amount of the payment, and even advertisements.

In embodiments where payment provider control 130 maintains information related to the consumer's account, the amount of the received payment is credited to the account. Payment provider control 130 credits the payment to the associated consumer provider (block 410). This can be done by wire transfer from the payment provider to a bank account associated with the consumer provider. Other methods may also be used to effectuate such a transfer. In addition, payment provider control 130 provides a notification of payments and associated accounts to consumer provider control 140 via network 120 (block 412). In turn, consumer provider control 140 updates the account balance of the consumer from which the payment was received.

In particular embodiments, the processes listed in block 410 are performed sometime after the processes listed in block 412. Thus, for example, a consumer may make a payment, and shortly thereafter the payment is reflected on their account with the consumer provider. Then, sometime later, the funds associated with the payment are actually transferred to the consumer provider.

As will be appreciated from the foregoing discussion, such an approach to accepting and processing payments provides a number of advantages. As just one of the advantages, an unbanked consumer can make cash payments on an account with a consumer provider remote from the consumer. Thus, a consumer no longer needs to send cash through the mail. As yet another advantage, a consumer that consistently states that "the check is in the mail" can be directed to a payment provider location near them to make the necessary payment. Thus, the aforementioned systems and methods can avoid the check is in the mail syndrome. Further, a consumer that desires to purchase goods, but would like to remain anonymous, can tender a cash payment via the payment provider, and thus avoid being traced by credit card or check information. Further, such methods can be used to make multiple payments across multiple consumer providers. Thus, a consumer need only enter a single transaction to pay a number of bills. Yet further, a consumer that is nearly late in paying can go to a local payment provider, tender payment, and have the payment immediately credited to their account, thus avoiding any late fees. More particularly, a consumer with a credit card bill due the next day can avoid late fees, or the necessity of sending payment via an overnight express service, by using a payment provider where the credit card company is affiliated with and accepts payment via the payment provider. Based on the disclosure herein, one of ordinary skill in the art will recognize a myriad of other advantages associated with the systems and methods disclosed herein.

Figure 4B:
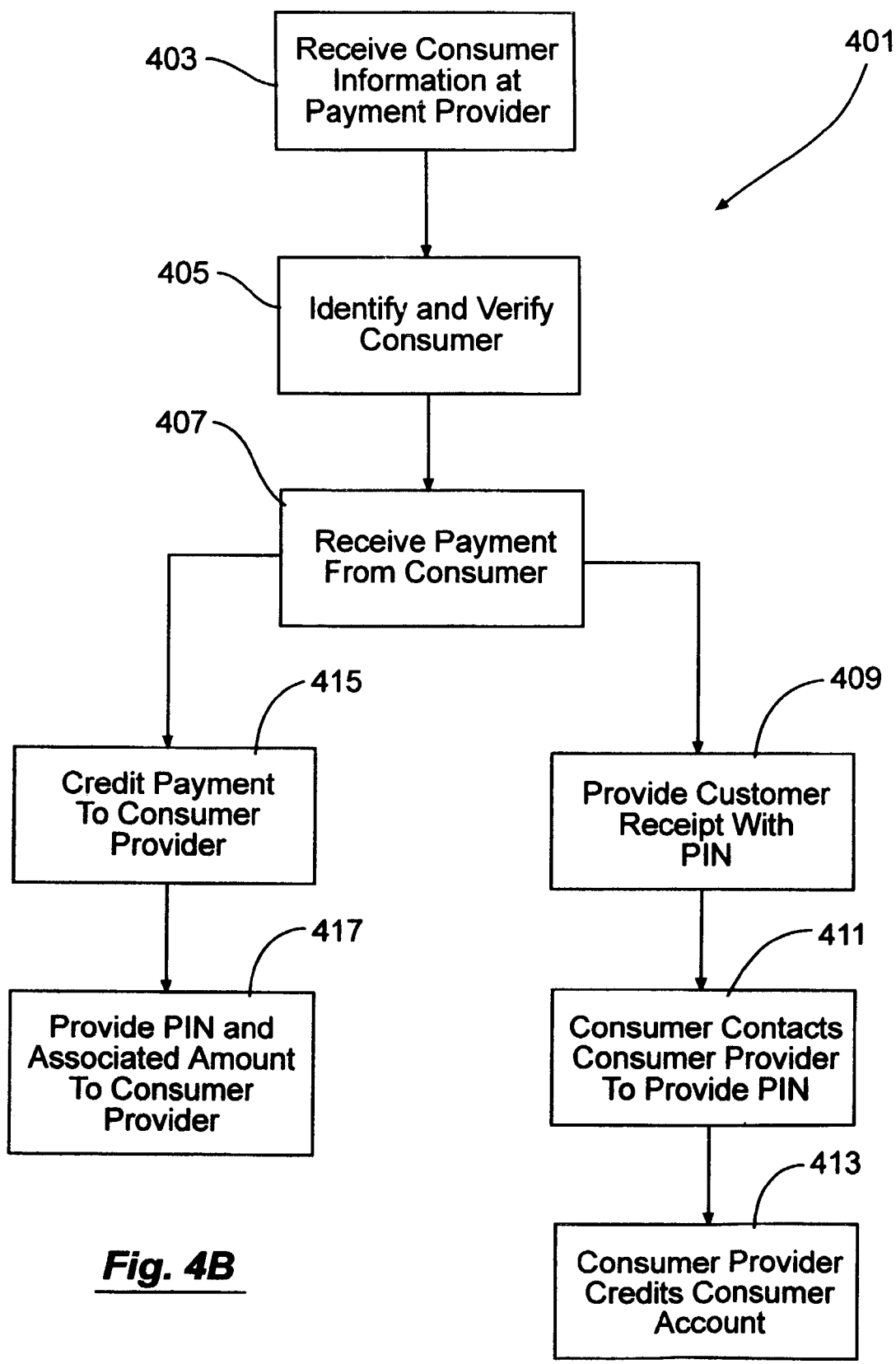

Referring to FIG. 4B, a flow diagram 401 illustrates another method of accepting payments in accordance with the present invention. Following flow diagram 401, information about the consumer desiring to make a payment is input to POS device 110 (block 403). As with the previous embodiment, the information obtained from the consumer depends upon the transaction being completed and can be determined by the consumer provider and/or the payment provider.

Once the consumer information has been provided, the information is used to identify and verify the consumer (block 405). This identification and verification is similar to that discussed in relation to FIG. 4A. After the consumer is identified and verified, the consumer tenders payment to the payment provider (block 406), again, similar to the manner discussed in relation to FIG. 4A.

Once the payment is received, POS device 110 transfers an indication that payment was received and the amount of received payment to payment provider control 130 via network 120. In some embodiments, payment provider control 130 responds via network 120 with an indication that the payment was received. Payment provider control 130 credits the received payment to the consumer provider (block 415), and provides an identifier, or PIN, to the consumer (block 417). The PIN is unique to the payment. Thus, a block of funds can be transferred to the consumer providers, with portions of the funds being associated with various PINs. In some embodiments, at this point in the method, the consumer provider is not aware of which consumers the funds are attributable.

POS device 110 also prints a receipt for the consumer (block 409). The receipt can include a variety of information, such as, the account for which payment was received, the amount of the payment, and even advertisements. In particular embodiments, the receipt includes an identification number, or PIN, that is unique to the received payment.

The consumer can then contact the consumer provider directly and provide the PIN (block 411). With this information, the consumer provider can verify that the PIN is valid and that a payment was received in association with the PIN. The amount of the payment associated with the PIN can then be credited to the consumer's account (block 413).

Figure 5:
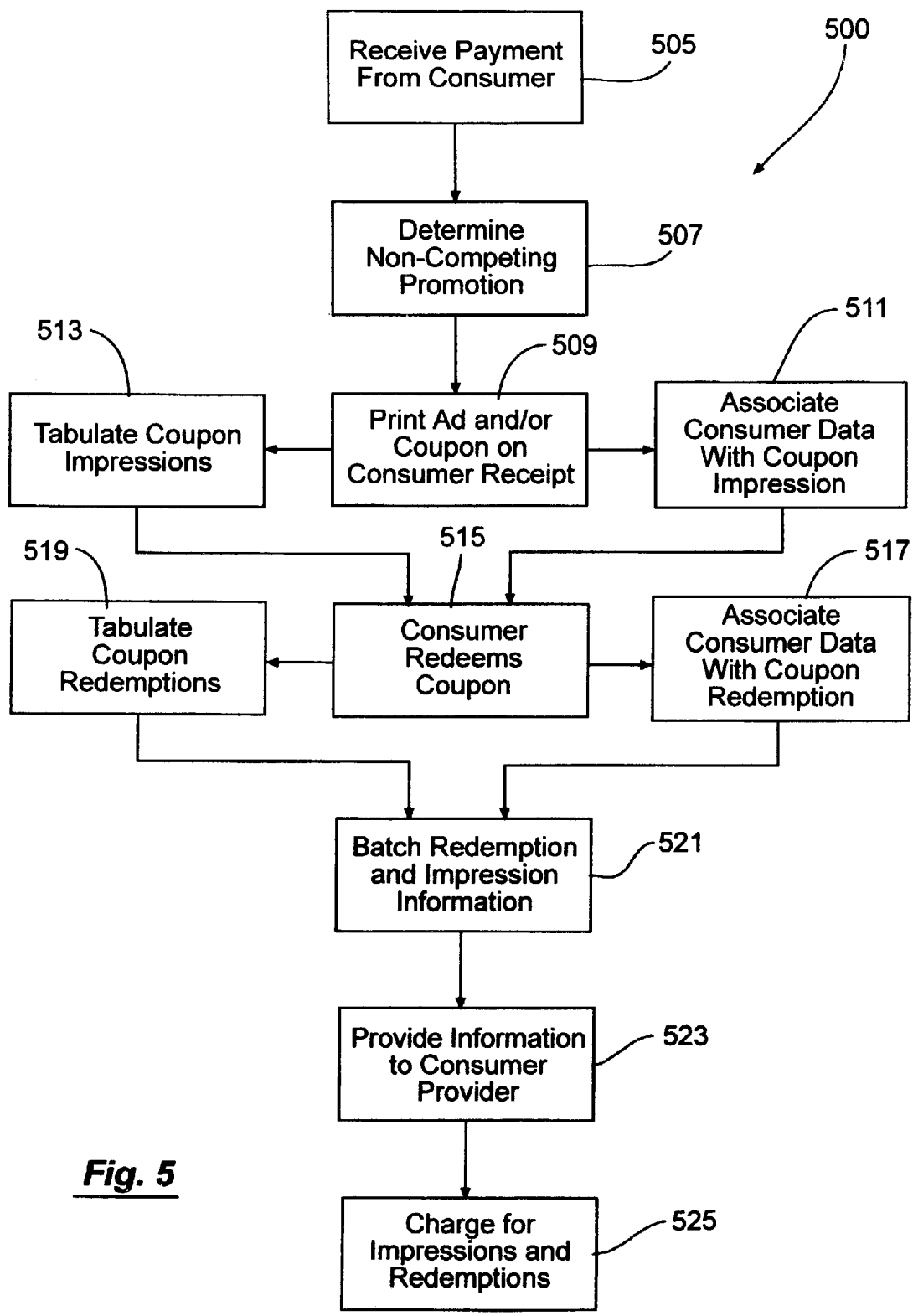
FIG. 5 is a flow diagram for providing coupon issuance and tabulation in accordance with embodiments of the present invention.

As previously mentioned, promotions can be presented to the consumer as the consumer interacts with the payment provider via POS device 110. FIG. 5 includes a flow diagram 500 illustrating one method in accordance with the present invention for presenting promotions to consumers. Following flow diagram 500, a payment is received from a consumer for a good or service which the payment provider is enabled to receive payments (block 505). The good or service for which the payment was received is used as the basis for determining other, non-competing products and/or services to promote to the consumer (block 507). It will be appreciated that other information can also be used to form the basis for determining additional promotions. In some embodiments, the additional promotions are determined by payment provider control 130 and downloaded to POS device 110 via network 120. In this embodiment, care is taken to avoid promoting goods and/or services that directly compete with the transaction effectuated in block 505. In this way, consumer providers are not dissuaded from affiliating with the payment provider.

Once the promotion is determined (block 507), it is printed on the receipt provided to the consumer in relation to the previously completed transaction (block 509). Data associated with the consumer, such as, purchasing habit data is associated with the coupon (block 511) and the coupon impression is tabulated (block 513). The tabulated coupon impression, and in some instances the associated consumer data, is charged to the consumer provider associated with the presented promotion.

Next, where the coupon is later redeemed by the consumer for the associated good or service (block 515), data associated with the consumer is associated with the redeemed coupon (block 517) and the coupon redemption is tabulated (block 519). As with the tabulated coupon impressions, the tabulated redemptions are charged to the consumer provider associated with the redemptions.

At some point, both the tabulated redemptions and impressions are batched for transfer to the associated consumer provider (block 521). Such batching can be accomplished by payment provider control 130. The batched information is transferred to the consumer provider (block 523). The transfer can be effectuated across network 120 from payment provider control 130 to consumer provider control 140. Upon transfer of the information, a charge is also provided to the consumer provider in relation to the redemptions and impressions (block 525). The charge can be automatically deducted from payments collected by the payment provider from consumers in relation to goods and services provided by the consumer provider. Alternatively, the charge can be provided as an invoice with the expectation that the consumer provider will later honor the invoice.

Figure 6:
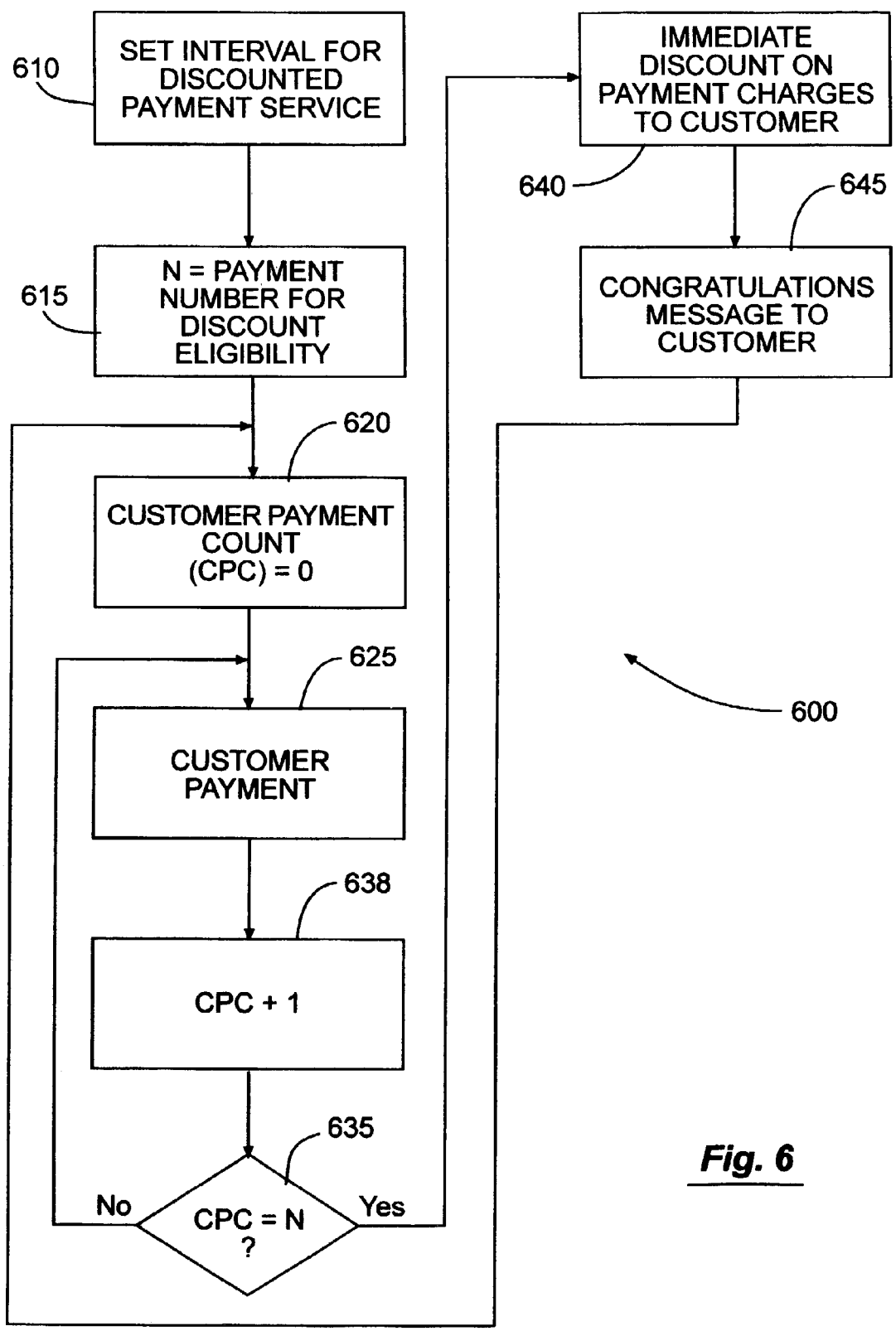
FIG. 6 is a flow diagram for providing an repeat consumer discount automatically in accordance with an embodiment of the present invention.

Additionally, in various embodiments of the present invention, repeat consumers can be automatically rewarded via payment provider control 130. Referring to FIG. 6, a flow diagram 600 illustrates an embodiment in accordance with the present invention for providing repeat consumer awards. Following flow diagram 600, an interval is set defining what level of account activity qualifies for repeat discounts (block 610). The interval can be set such that if, for example, five payments are made on time with a consumer provider providing a particular service, then the fifth service period is provided at a ten percent discount. This allows a consumer provider, such as, for example, an electric utility to provide immediate gratification to consumers to encourage prompt payment for service. While such a discount scheme is useful to a utility, one of ordinary skill in the art will recognize a number of other applications and/or approaches to apply the method.

The interval is provided to payment provider control 130 as a number "N" (block 615). A count ("CPC") is maintained in association with each consumer account and is initially set to zero indicating that no transactions have been tallied yet (block 620). When a consumer makes a payment via the payment provider (block 625), payment provider control 130 increments the CPC (e.g., CPC+1) (block 630).

If the CPC equals the interval count N (block 635), then payment provider control 130 provides an indication to POS device 110 that the consumer is due an immediate discount and the amount thereof (block 640). A congratulatory message is displayed by POS device 110 (block 645), and the amount tendered from the consumer is either reduced or a refund is provided to reflect the discount. A receipt reflecting the transaction including the discount can be printed by POS device 110 for the consumer. In addition, the CPC for the consumer is reset to zero (block 620). Alternatively, where the CPC is less than the interval count N (block 635), no discount is offered, but rather the CPC count is maintained and the next payment is awaited (block 625).

Figure 7:
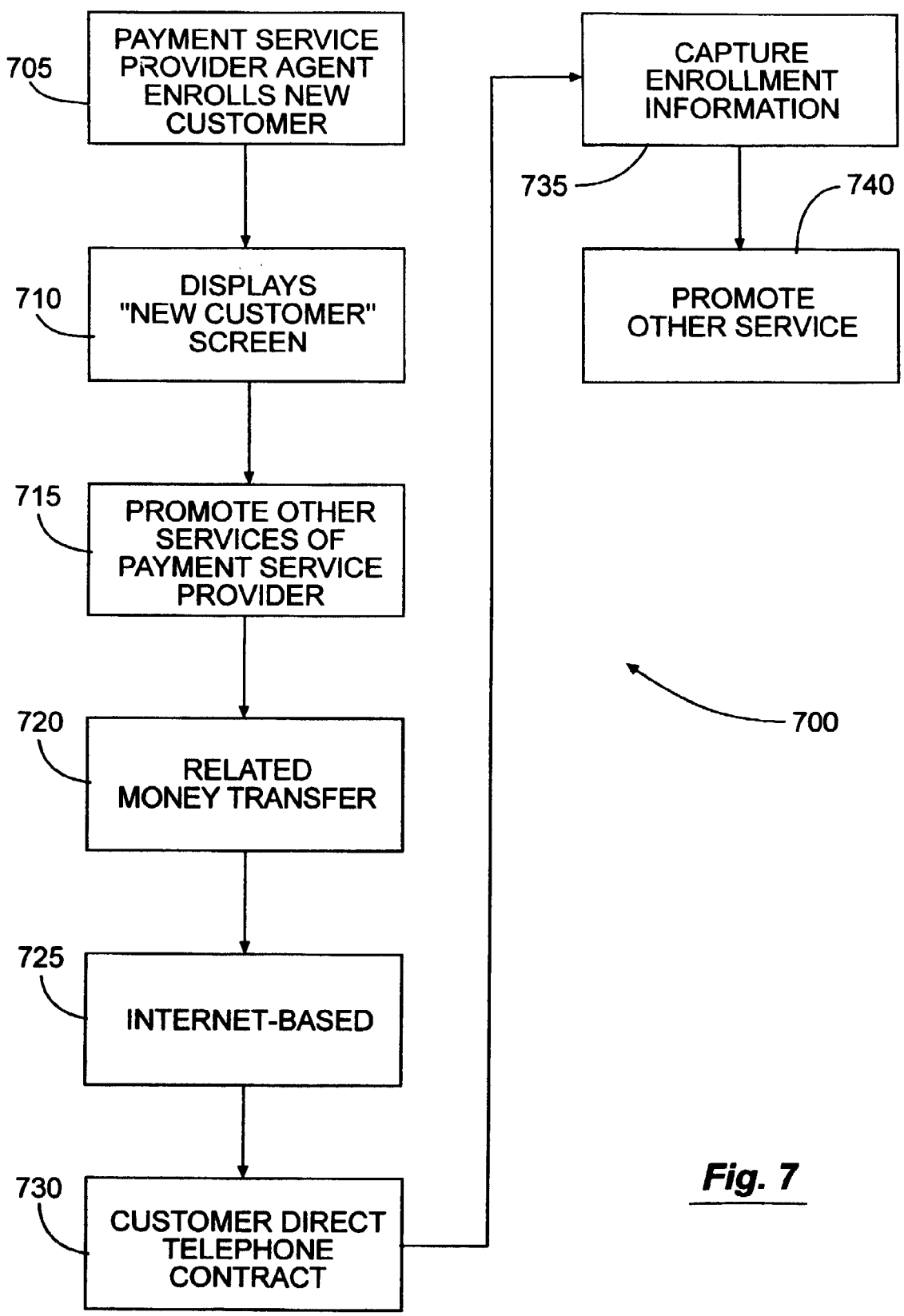
FIG. 7 is a flow diagram for a payment provider cross selling service in accordance with an embodiment of the present invention.

Referring to FIG. 7, a cross selling method in accordance with the present invention is described in relation to a flow diagram 700. A payment provider enrolls a consumer (block 705). As part of enrolling the new consumer, a welcome screen is displayed via POS device 110 (block 710). In addition to the welcome message, one or more additional goods or services can be presented to the consumer via POS device 110 (block 715). The additional services can be provided by the same consumer provider with which the consumer was originally enrolled, a different consumer provider, or even the payment provider. However, in some embodiments, it is desirable not to promote goods or services competing with similar goods or services from the original consumer provider.

For example, other related money-transfer services of the payment provider can be promoted to the consumer (block 720), Internet-based services (block 725), and/or direct telephone contact services (block 730) associated with the payment provider can be promoted. The consumer can be enrolled in any of these additional services and to that end, consumer enrollment information is obtained in relation to the enrolled good or service (block 735). Then, in some embodiments, additional goods or services related to the enrollment of block 735 can be promoted (block 740).

Figure 8:
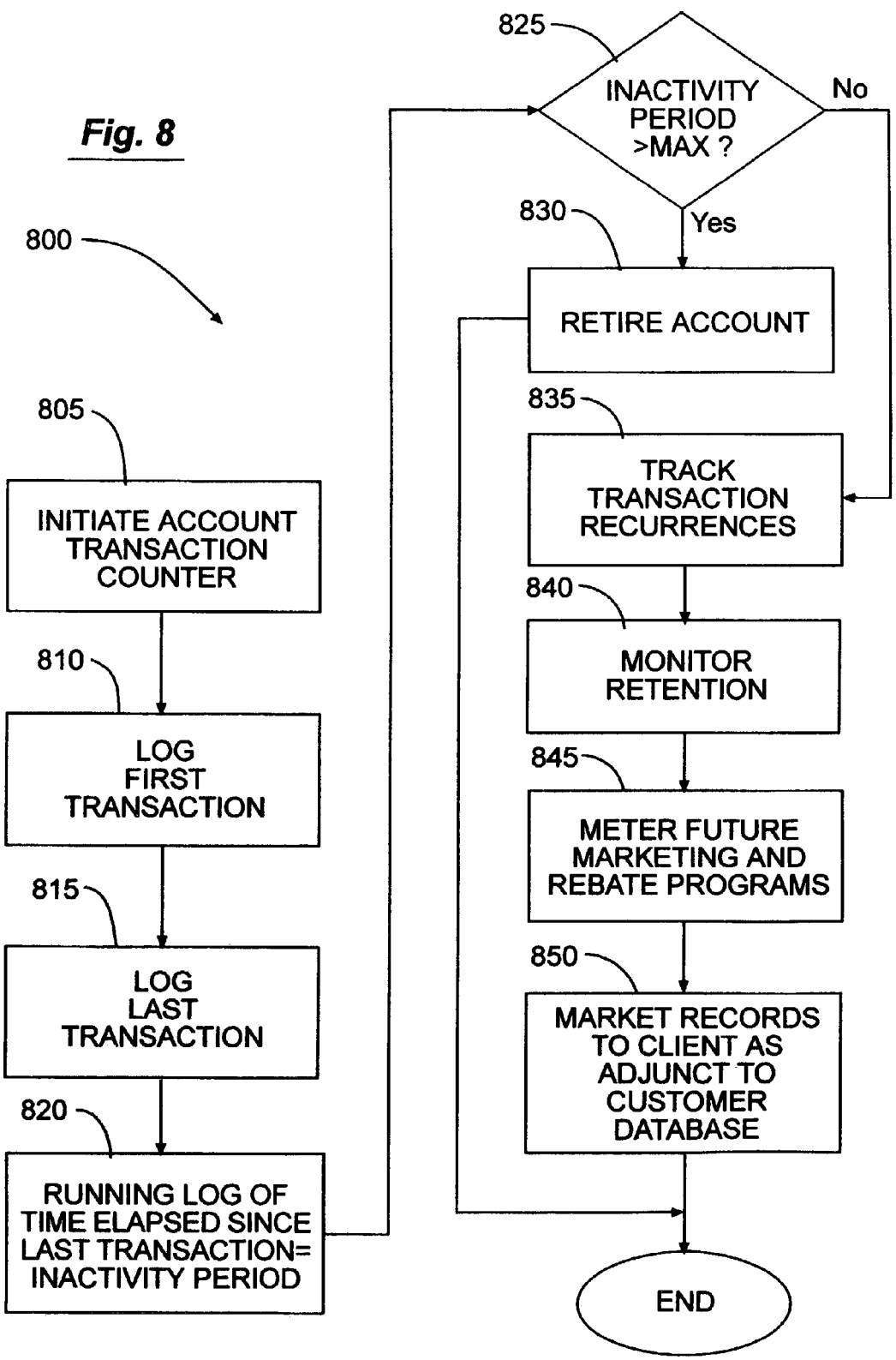
FIG. 8 is a flow diagram for invalidating accounts in accordance with various embodiments of the present invention.

Referring to FIG. 8, a transaction metering method in accordance with the present invention is described in relation to a flow diagram 800. Following flow diagram 800, a transaction counter is initiated (block 805) and a first transaction associated with a consumer's account is registered (block 810). A last transaction is logged (block 815) and a running log of time elapsed since the last transaction (corresponding to an inactivity period) is maintained (block 820). If the accrued inactivity period is greater than a preset limit (block 825), then the consumer's account is declared inactive and retired (block 830).

Alternatively, if the accrued activity period is less than the preset limit (block 825), the account is maintained and track transaction recurrences (block 835), as well as, retentions are monitored (block 840) in relation to the maintained account. In addition, future marketing and rebate programs are metered (block 845) with the records being provided to a consumer provider (block 850). Such records can be used as an adjunct to the consumer provider's database.

Figure 9:
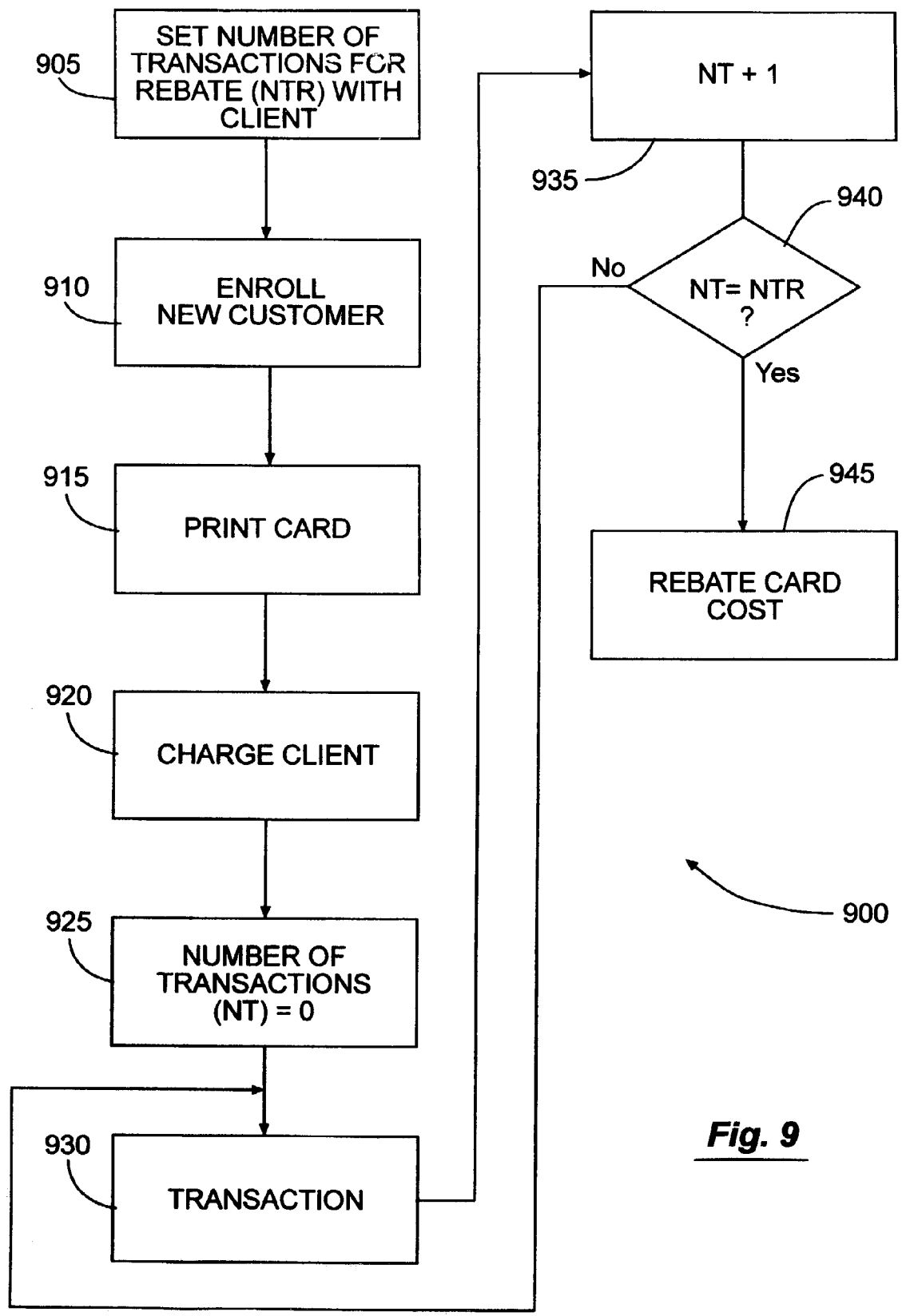
FIG. 9 is a flow diagram for automatically rebating card costs in accordance with embodiments of the present invention.

Referring to FIG. 9, a card reimbursement method in accordance with the present invention is described in relation to a flow diagram 900. In some embodiments, a consumer provider pays the initial costs of setting up accounts with various consumers. Over time, these costs are recouped by the payment provider, and a refund of the initial costs, or a portion thereof is provided back to the consumer provider. For example, in some situations, consumer provider may be required to pre-pay for all stored value cards issued in relationship to enrolling its consumers with the payment provider.

Following flow diagram 900, an interval, or number of transactions, is set to control the number of transactions that are to occur before a rebate is granted (block 905). Consumers are also enrolled with the payment provider using any method including those discussed in relation to FIGS. 3 (block 910). Upon enrollment, a card can be printed and provided to the consumer (block 915). The card can be a stored value card, an identification card, a frequent purchaser card, or any type of card. Upon issuing the card, the consumer provider to which the card is attributed is charged for enrolling the consumer (block 920). Such a charge can be made against payments tendered to the payment provider for accounts held by the consumer provider. Such a process of debiting can proceed automatically between payment provider control 130 and consumer provider control 140 at set settlement periods. In particular embodiments, the charge covers marketing and other processes related to enrollment, while in other embodiments, the charge is simply for the costs of providing a card.

The number of transactions (NT) for the enrolled consumer is initialized to zero (block 925). Thereafter, the transaction count NT is incremented upon completion of each transaction with the consumer (blocks 930, 935). Once the number of transactions equals the predetermined limit set in block 905 (block 940), the costs associated with enrollment are rebated to the consumer provider (block 945).

Figure 10:
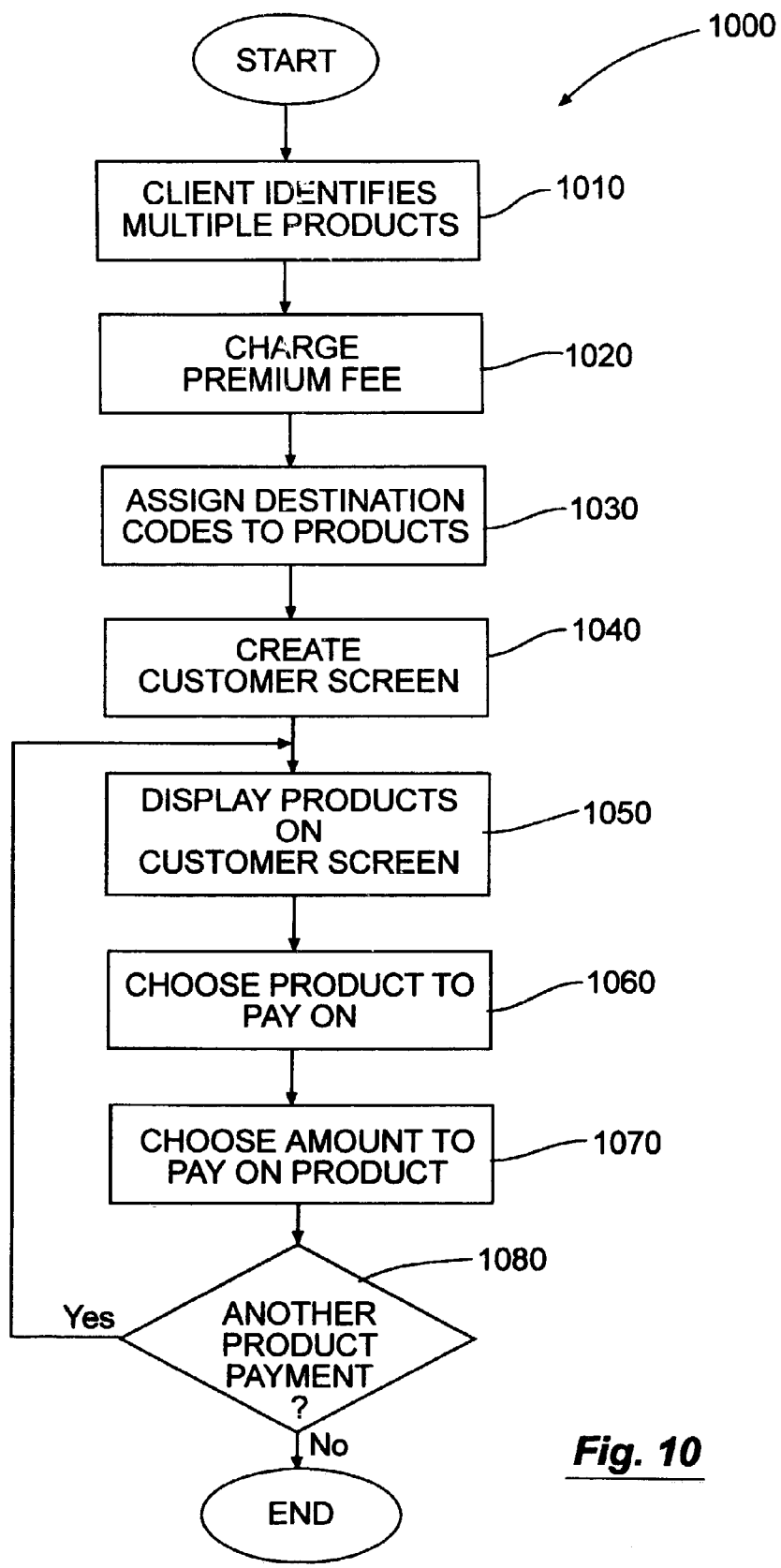
FIG. 10 is a flow diagram in accordance with an embodiment of the present invention for processing payments associated with multiple products of a consumer provider.

Referring to FIG. 10, a method according to the present invention of accepting and processing multiple payments in a single transaction is illustrated as a flow diagram 1000. Following flow diagram 1000, one or more consumer providers identify goods and/or services for which they would like to receive payment via the payment provider (block 1010). For example, a consumer provider of telecommunications services might provide various products such as prepaid dial tone, prepaid cellular, prepaid internet access and insurance. All of these products can be provided on a single card. The payment provider then charges a premium fee for accepting the products into its system (block 1020). In some cases, this fee is added to the listed goods and services and recouped on a transactional basis. In other embodiments, this fee is a one time fee charged to the consumer provider, or a transactional fee charged to the consumer provider. Destination codes can be assigned to the various goods and services making it capable to credit and access the proper consumer provider (block 1030). In addition, a custom screen can be created for presenting the goods and services to the consumer via POS device 110 (block 1040). Such display information can be maintained on database 135 and accessed in real time by POS device 110, thus allowing for global modifications to the display information through access to payment provider control 130.

The various goods and services are displayed on a screen (block 1050). In some embodiments, this can include all goods and services for which payment can be accepted. The consumer initiates a payment by selecting one or more goods and/or services received by the consumer (block 1060). In some embodiments, this is done manually by having the consumer step through one or more display screens to identify all of the desired goods or services. In other embodiments, this can be done automatically by identifying the consumer via POS device 110 and transferring the identification information to payment provider control 130. In turn, payment provider control 130 accesses all possible accounts associated with the identified consumer and provides a listing of all accounts to POS device 110. POS device 110 can then intelligently display a selection option to allow a consumer to select the accounts on which to pay. Based on this discussion, one of ordinary skill in the art will recognize other options for allowing a consumer to choose accounts on which to pay.

The consumer then indicates the amount to pay on each of the goods or services chosen (block 1080). After choosing the goods and services and selecting an amount to pay on each, the aggregate amount is tendered. The aggregated amount is then disbursed by payment provider control 130 to the various consumer providers and/or products thereof to which portions of the aggregated payment are attributable.

Figure 11:
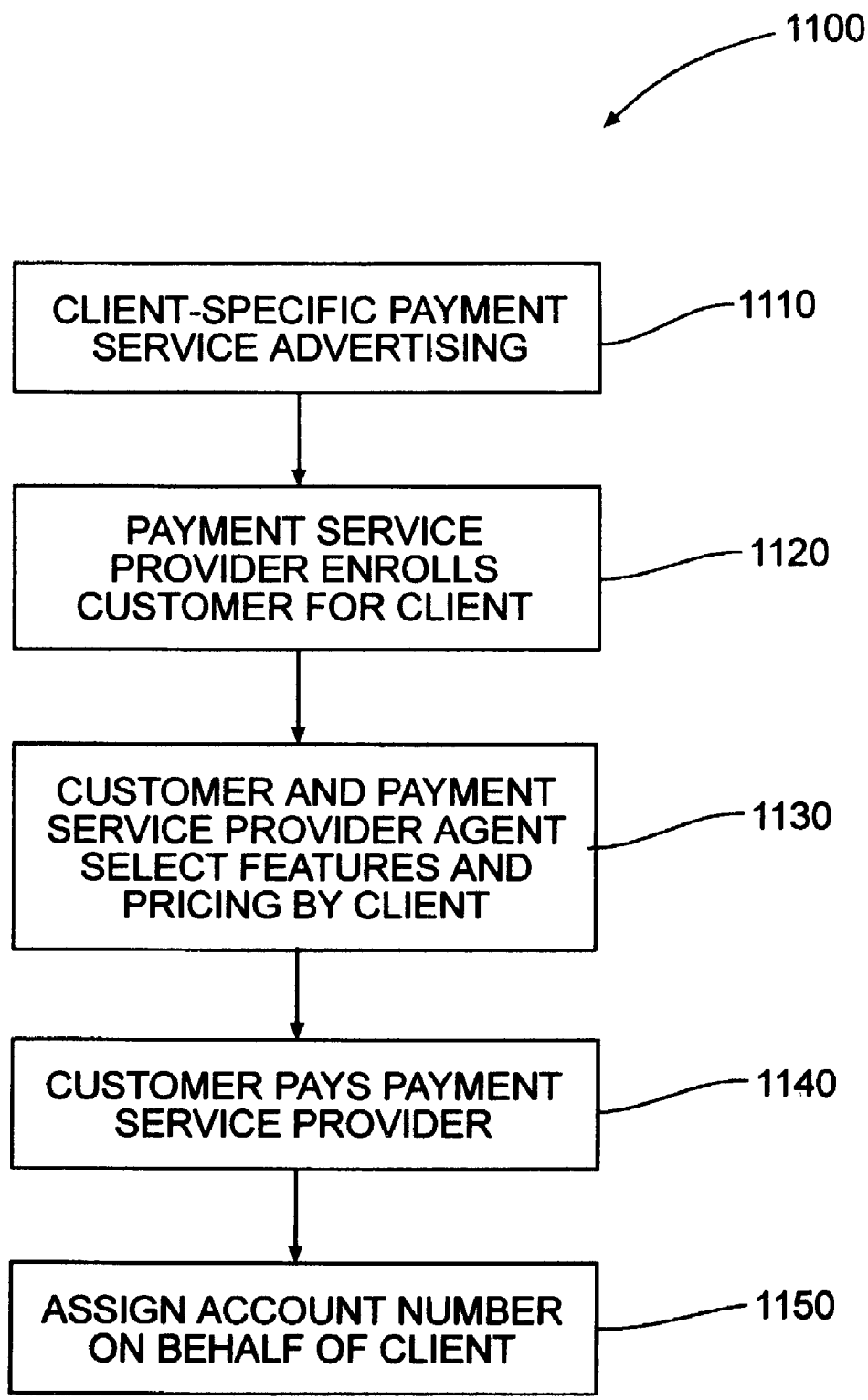
FIG. 11 is a flow diagram of client specific enrollment in accordance with the present invention.

Flow diagram 1100 of FIG. 11 illustrates a consumer provider specific enrollment methodology, as contrasted with a generic enrollment procedure. Following flow diagram 1100, the consumer provider develops advertising which identifies the payment provider as accepting payments associated with the consumer provider (block 1110). Such advertising can direct consumers to the payment provider for both payment and enrollment purposes. Consumers are then enrolled by the payment provider using various methods including those previously discussed (block 1120). The consumer can be either a present or prospective consumer of the consumer provider's goods or services. Either or both of the payment provider and the consumer select the features and pricing desired by the consumer and offered by the consumer provider for the consumer provider's products (block 1130). An account number can optionally be assigned on behalf of the consumer provider by the payment service provider (block 1150). In addition, payment can be tendered from the consumer to the payment provider acting on behalf of the consumer provider (block 1140).

Figure 12:
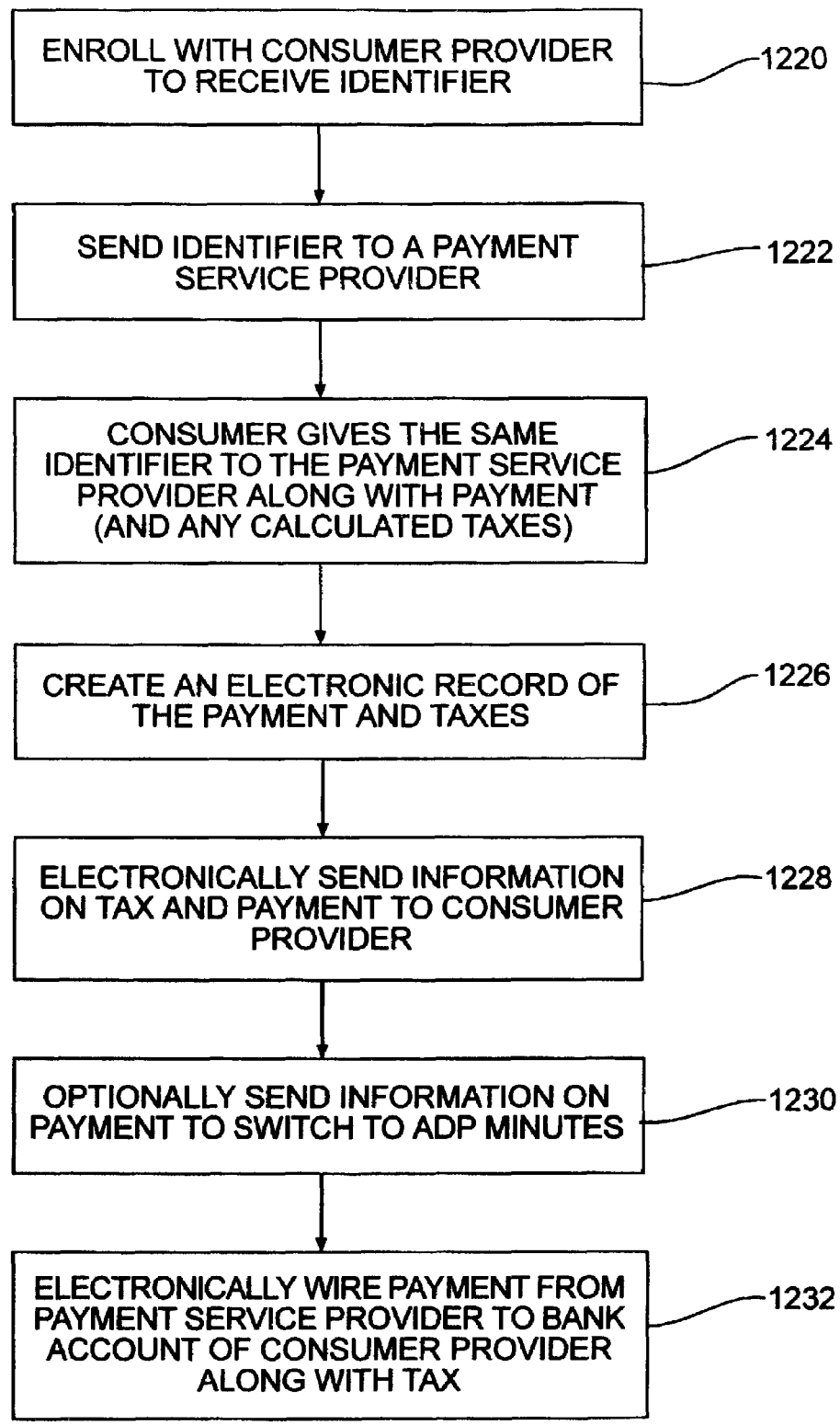
FIG. 12 is a flow diagram illustrating one method in accordance with the present invention for paying for a good or service.

Referring to FIG. 12, one method for pre-paying for a good or service is described in relation to flow diagram 1200. As illustrated by flow diagram 1200, a consumer enrolls with a consumer provider to order a good or a service (block 1220). For example, services that may be ordered include phone service, including phone minutes, a stored value service, and the like. Goods that may be purchased include essentially any type of good including retail items, clothing, furniture, sporting goods, cosmetics, toiletries, durable goods, vehicles and the like.

When such an enrollment is requested, the consumer provider creates an electronic account to maintain a record of payments and supplied goods and/or services provided to the consumer. Such an account can be maintained in database 145 of the consumer provider control 140 associated with the particular consumer provider. The account may also include a historical record of the consumer's behavior, and any other relevant information. In some instances, an enrollment may only be for one particular purchase, while in other cases an enrollment may be intended for a longer period and anticipate multiple or ongoing purchases.

In addition, a unique identifier is also associated with the account and included in the record to uniquely identify the request. This identifier may be any type of identifier as previously described, including phone numbers, order numbers, credit card numbers, social security numbers and the like. In some instances where only a one-time purchase is to be recorded, the identifier is specific to the single transaction. However, in other instances, the identifier can be intended to designate the consumer in any number of future transactions. In yet other instances, the identifier can designate both the consumer in ongoing transactions and designate a particular transaction. Thus, for example, the identifier may include a portion unique the consumer and reused across multiple transactions, and another portion designating a particular transaction.

The identifier is provided to the consumer along with instructions as to where a payment may be made. The instructions indicate a location of a POS device 110 associated with a payment provider control 130 capable of accepting payments for the particular consumer provider. In some embodiments, the consumer provider may access an affiliated payment provider control 130 via its consumer provider control 140 to request location information for a POS device 110 that is convenient to the consumer. In one particular embodiment, the consumer's address is provided along with the request for location information. Based on this address information, payment provider control 130 identifies the nearest five POS devices 110 and provides this information to consumer provider control 140. In turn, the received location information is shared with the consumer.

After the consumer is enrolled (block 1220), the identifier is electronically sent from consumer provider control 140 to payment provider control 130 where it is stored in database 135 (block 1222). Relevant account information is also provided to payment provider control 130, such that a consumer's account may be properly debited and/or credited by payment provider control 130. When ready to make the payment, the consumer goes to one of the previously indicated locations (or another location if the consumer so desires) and provides the identifier via the POS device 110 at the location (block 1224). After entry of the identifier, POS device 110 transmits the identifier to payment provider control 130. Payment provider control 130 accesses the consumer's account based on the identifier, determines the amount to be tendered from the consumer, and returns this determined amount to POS device 110. The amount is then displayed on POS device 110 where it can be viewed by either or both of a merchant and the consumer. The determined amount can be displayed along with any other fees associated with the transaction.

The consumer then tenders payment to the merchant, or automatically via POS device 110 where such capability is provided. Upon tendering of payment (block 1224), the amount of payment tendered is provided to payment provider control 130 via POS device 110. This payment information is used to create an electronic record of the payment (block 1226). This payment information is then sent to consumer provider 140 associated with the consumer provider (block 1228). In the case of a communications service, this information may also be sent to a switch (block 1230). This information can then be used by the switch to immediately add time to a cell phone account or provide other telecommunications features rendered by the switch.

A sum equal to the payment (and in some cases less a transaction fee charged to the consumer provider) is electronically wired to a bank account of the consumer provider (block 1232). In some instances, the consumer provider proceeds to fulfill the purchase of the consumer prior to receipt of the wire transfer. Alternatively, in other embodiments, the consumer provider is notified that the payment has been received by payment provider control 130, upon which the consumer provider continues to fulfill the consumer's purchase. Sometime later, the wire transfer is completed. To fulfill the consumer's purchase, an ordered good may be pulled from inventory and shipped to the consumer or other recipient. Alternatively, a stored value account may be credited upon notification of payment.

Figure 13:
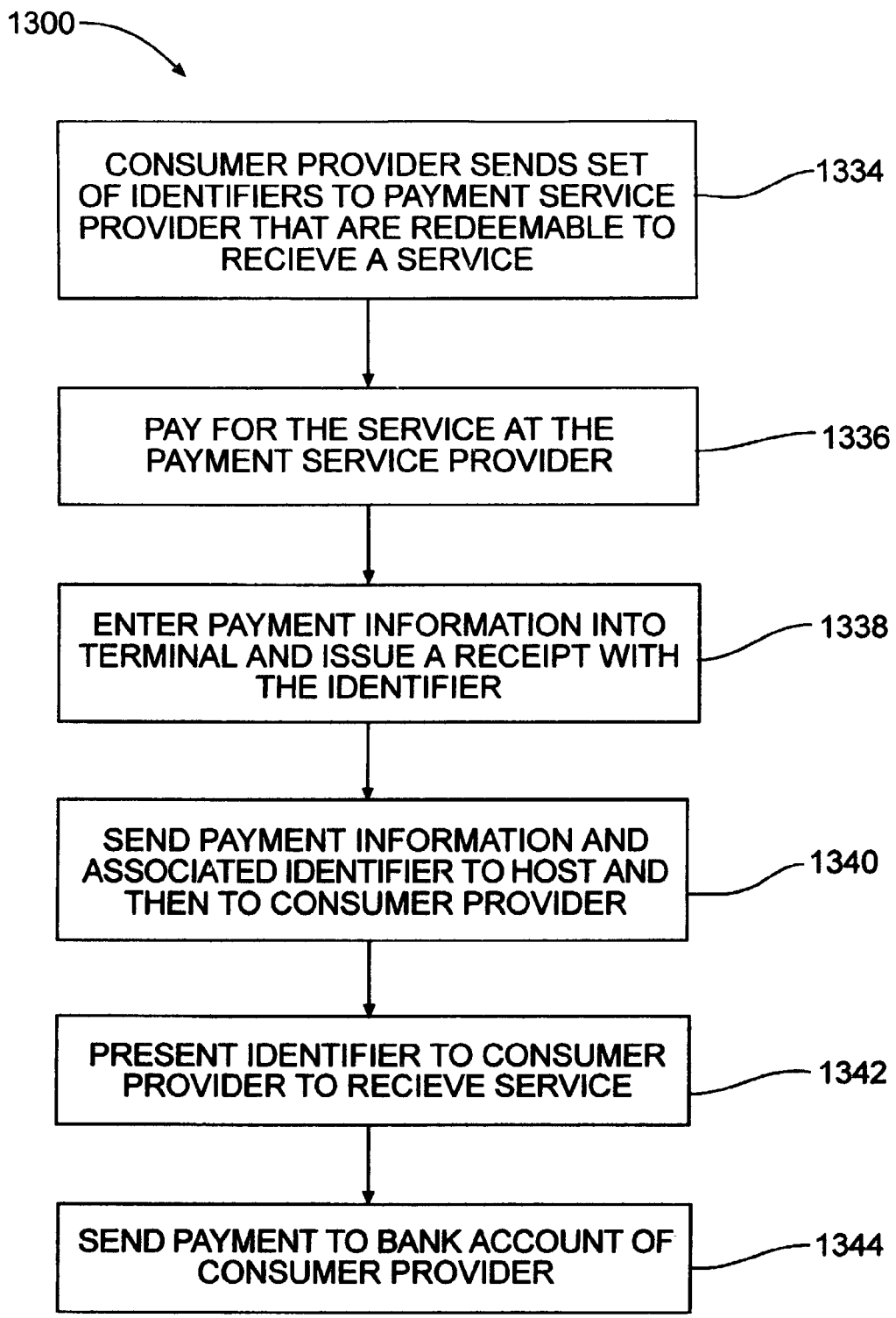
FIG. 13 is a flow diagram illustrating another method for paying for a good or service according to the invention.
Figure 14:
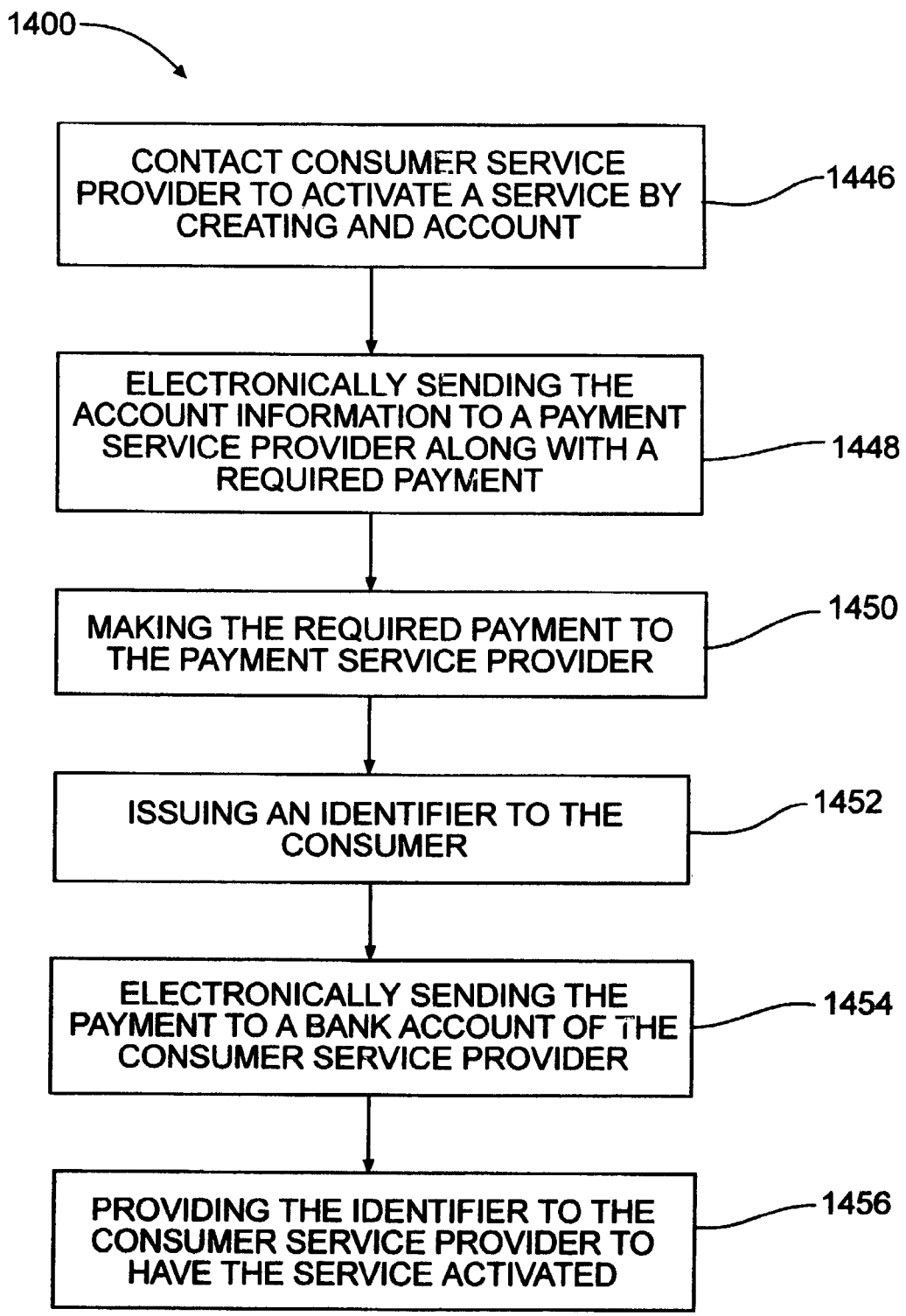
FIG. 14 is a flow diagram illustrating a service activation method according to the invention.

Referring to FIG. 13, yet another payment method in accordance with the present invention is described in relation to flow diagram 1300. This method is particularly useful in prepaying from some type of stored value card, without requiring the issuance of a physical card. In this way, an identification number may be used to "store" a stored value. For example, a consumer may purchase a stored value of phone time that is associated with an identifier. This identifier may then be presented to phone company to add calling time to a phone.

As illustrated by flow diagram 1300, a consumer provider sends a block of one or more identifiers to a payment provider (block 1334). In some embodiments, this is done by electronically transmitting the block of identifiers from a consumer provider control 140 associated with the consumer provider to the payment provider control 130 associated with the payment provider where they are stored in database 135. Such a transfer can be initiated once when the payment provider is initially affiliated with the consumer provider, on recurring basis when the payment provider requests additional identifiers, or any other suitable time.

In this embodiment, the identifiers are redeemable by consumers 190 to receive a service provided by a particular consumer provider. For example, the identifiers may be redeemed to receive a certain number of minutes on a phone, to purchase goods at retail, over the web, over the phone, or the like. When ready to pay for such goods or services, consumer 190 contacts payment provider control 130 and requests to pay for a certain good or service (block 1336). Such contact can be accomplished via any of the interfaces 12 illustrated in FIG. 2. Thus, for example, consumer 190 can contact payment provider control 130 via a telephone. As another example, consumer 190 can contact payment provider control 130 via a POS device 110. It should be recognized that contact can be initiated in any number of ways, but for clarity, the remainder of the method is described in relation to contact initiated via POS device 110.

As just one example, consumer 190 may request to purchase a $20 calling card, a $20 retail card, or the like. Consumer 190 enters the desired amount and product via a POS device 110. This information is transmitted to payment provider control 130 along with a request to determine if such a good or service is available. If such a good or service is available, payment provider control 130 indicates such and returns an identifier to be associated with the transaction to POS device 110. Upon the indication that such a transaction is possible, consumer 190 tenders payment either to a merchant, or directly via POS device 110 where POS device 110 is capable of receiving payments (block 1338).

After payment is accepted, POS device 110 associates the tendered payment information to the received identifier. In addition, POS device 110 prints a receipt for consumer 190 (block 1338). The receipt includes the identifier along with various transaction information, such as, amount, date and time, and the like. Yet further, the payment information and associated identifier are sent from POS device 110 to payment provider control 130, from where it can be transmitted to consumer provider control 140 associated with the consumer provider (block 1340).

When consumer 190 is ready to receive the good or service, consumer 190 contacts the consumer provider and presents the previously obtained identifier (block 1342). For example, consumer 190 may phone a cell phone company and give the identifier to have phone time added to a cell phone. Alternatively, consumer 190 may contact a seller in an auction and give the identifier to have the seller proceed to ship a purchased item.

Either coincident with receipt of the payment from consumer 190, or sometime thereafter, payment provider control 130 credits the payment amount (in some cases less transaction fees) to a bank account associated with the consumer provider (block 1344). This may be accomplished by an ACH transfer as is known in the art.

In particular embodiments, the payment is not transferred from payment provider control 130 to the consumer provider until consumer 190 receives purchased goods. Thus, in some instances, the present embodiment can be used as an escrow service. In such embodiments, consumer 190 can be given a limited period after requesting goods using the identifier to dispute the transaction and request return of the payment. If such a dispute is not lodged within a predetermined time frame, the payment is transferred from payment provider control 130 to the consumer provider. If such a dispute is lodged, the payment may be returned to consumer 190 where sufficient evidence exists that the goods were either not received or returned.

Various embodiments of the present invention also provide for activating a service, such as phone service, utility service, newspaper deliver, or the like. One example of such a process is illustrated as flow diagram 1400 of FIG. 14. As illustrated in flow diagram 1400, a consumer contacts a consumer provider to request a service (block 1446). An account is set up with the consumer provider and a record is created containing the information needed to provide the service requested by the consumer. In some embodiments, the account is maintained in database 145 and accessible to the consumer provider control 140 associated with the consumer provider. To pay for the service, the consumer is instructed by the consumer provider to contact a payment provider.

At least some of this account information is transferred from consumer provider control 140 to payment provider control 130 (block 1448). The transferred account information can include the amount of payment needed to have the requested service activated and may be maintained in database 135 associated with payment provider control 130.

The consumer then contacts the payment provider, tenders payment, and requests that the payment be forwarded to the consumer provider (block 1450). Payment may be tendered to a merchant associated with the payment provider. Further, in some cases, payment may be facilitated by accessing POS device 110 located at a merchant location and in communication with payment provider control 130. Additionally, POS device 110 can be used to access the account information maintained in database 135. A display screen on POS device 110 may display the appropriate account information along with the required payment and any service fee. The consumer then makes the payment as provided on the display, and an identifier is issued to the consumer (block 1452). For example, a receipt may be printed by a printer in communication with POS device 110 that includes the identifier. Conveniently, the identifier may be assigned to the account by the consumer provider when the account is created.

The payment received from the consumer is then electronically transferred from the payment provider to a bank account of the consumer provider. This may be an ACH transfer processed under control of payment provider control 130. In addition, the payment information along with the identifier, is electronically transferred from payment provider control 130 to consumer provider control 140 (block 1456). Upon receiving an indication that the payment has been received by the payment provider, the consumer provider may then activate the requested service.

In a modification to the method of flow diagrams 1200, 1300, and 1400, the invention may also be used to issue physical cards having a stored value. These cards may be traditional debit cards having an account number and personal identification number (PIN). These cards may be accepted anywhere where traditional debit cards are used, such as those employing the use of a debit network where ACH transfers are processed.

In such cases, the consumer provider can provide the payment provider with account numbers and PINs. These are associated with physical cards and the account numbers may be embossed on the cards. When one of these cards are purchased, the stored value can be updated from payment provider control 130 to consumer provider control 140, where it is maintained on database 145. When a purchase is made, the request is sent to a debit system that is capable of processing ACH transactions. This debit system contacts consumer provider control 140 to verify the account and provide the appropriate debit to the account. Hence, once the account balance reaches zero, no more purchases may be made without again contacting the payment provider and tendering payment. The tendered payment is recorded to payment provider control 130 and updated to consumer provider control 140. The funds associated with the payment are also transferred to an account maintained by the consumer provider. In this way, a card is only good for the amount of prepayment. Further, the card may only be used with the PIN, thereby reducing the chances of fraudulent purchases.

The invention may also permit stored value records without issuing physical cards. In such cases, the payment service provider may generate its own set of identifiers and store them in a database. A consumer may then make a payment to the payment service provider and be issued one of the identifiers. The amount of payment is then stored in the database as a stored value record. The consumer may then use this identifier to pay for goods or services from any merchant that will accept such an identifier. For example, the identifier may be a routing number that is recognized buy an ACH transfer system. In such cases, the identifier may be used to debit the stored value account and to pay the merchant using an ACH transfer.

The invention has now been described in detail for purposes of clarity and understanding. However, it will be appreciated that certain changes and modifications may be practiced within the scope of the appended claims. For example, a number of forms of system 100 may be implemented in accordance with the present invention. More particularly, system 100 can include any number of POS devices 110, payment provider controls 130, and/or consumer provider controls 140. Further, system 100 can be configured exclusively as an enrollment system, exclusively as a payment system, or as some combination of payment and enrollment system. Further, the functions of the systems, and methods of using such are merely exemplary. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method for enrolling a requestor with one or more consumer providers, the method comprising:
    at a payment provider location, providing an enrollment system, wherein the enrollment system comprises a point-of-sale device associated with a money transfer system maintained by a payment provider, wherein the enrollment system includes an entry device, a display screen, and a memory;
    at the payment provider location, receiving into the point-of-sale device an identifier from the requestor, wherein the identifier relates to a payee and a prior indebtedness of the requestor to the payee for a good or service provided by the payee;
    sending the identifier from the point-of-sale device to a host computer system;
    at the host computer system, receiving a set of identifiers into a database comprising existing requestor account information, the database being operated by the payment provider, using the identifier to locate a transaction record relating to the requestor and the payee;
    returning at least a portion of the transaction record to the point-of-sale device;
    using the point-of-sale device to facilitate an in person payment to the payee from the requestor for the indebtedness;
    using at least a portion of the transaction record to obtain information about a good or service from a consumer provider that is different than the payee and loading the information into the memory;
    in association with facilitating the payment, displaying via the display screen at least one enrollment option relating to the consumer provider;
    receiving via the entry device a request for enrollment from the requestor to enroll with the consumer provider; and
    processing the request for enrollment, wherein the requestor is enrolled with the consumer provider.

2. The method of claim 1, wherein the consumer provider is a first consumer provider, and the memory further contains information associated with a good or service available from a second consumer provider, and wherein the method further comprises:
    displaying via the display screen another enrollment option, wherein the other enrollment option includes the information associated with the good or service available from the second consumer provider.

3. The method of claim 1, wherein the good or service available from the consumer provider is a first good or service, and the memory further contains information associated with a second good or service available from the consumer provider, and wherein the method further comprises:
    displaying via the display screen another enrollment option, wherein the other enrollment option includes the information associated with the second good or service.

4. The method of claim 3, wherein the consumer provider is a first consumer provider, and the memory further contains information associated with a third good or service available from a second consumer provider, and wherein the method further comprises:
    displaying via the display screen another enrollment option, wherein the other enrollment option includes the information associated with the third good or service available from the second consumer provider.

5. The method of claim 1, wherein the information associated with the good or service comprises information provided by a third party and related to the good or service offered by the consumer provider.

6. The method of claim 5, wherein the information provided by the third party is reliability information related to the good or service offered by the consumer provider.

7. The method of claim 1, wherein the receiving via the entry device comprises receiving information about the requestor.

8. The method of claim 7, wherein the information about the requestor is received from a database maintained by the payment provider.

9. The method of claim 7, wherein the information about the requestor comprises credit information about the requestor.

10. The method of claim 7, wherein the information about the requestor is compared against a database of known information to authenticate the requestor.

11. The method of claim 1, wherein processing the request for enrollment comprises:
    assigning an account number to the requestor; and
    providing the account number to the requestor.

12. The method of claim 1, wherein processing the request for enrollment comprises:
    assigning an account number to the requestor, wherein the account number is inchoate; and
    providing the account number to the requestor, wherein the requestor must contact the consumer provider to activate an account associated with the account number.

13. The method of claim 1, the method further comprising:
    receiving payment for the good or service from the requestor.

14. The method of claim 13, wherein at least a portion of the payment is electronically forwarded to the consumer provider.

15. A system for enrolling a consumer with one or more consumer providers, the system comprising: an enrollment device, located at a payment provider location, wherein the enrollment device comprises a point-of-sale device associated with a money transfer system maintained by a payment provider, wherein the enrollment system includes an entry device, a display screen, a processor, and a memory;
 instructions maintained on the memory and executable by the processor to:
 receive into the point-of-sale device an identifier from the consumer, wherein the identifier relates to a payee and a prior indebtedness of the consumer to the payee for a good or service provided by the payee;
 send the identifier from the point-of-sale device to a host computer system, wherein the host computer system includes a set of identifiers in a database comprising existing requestor account information, the database being operated by the payment provider, the set of identifiers being received from a consumer provider;
 receive from the host computer system at least a portion of a transaction record relating to the consumer and the payee;
 use the point-of-sale device to facilitate an in person payment to the payee from the consumer for the indebtedness;
 receive information about a good or service from a consumer provider that is different than the payee and load the information into the memory;
 in association with facilitating the payment, display via the display screen at least one enrollment option relating to the consumer provider;
 in association with facilitating the payment, display via the display screen at least one enrollment option relating to the consumer provider;
 receive via the entry device a request for enrollment from the consumer to enroll with the consumer provider; and
 process the request for enrollment, wherein the consumer is enrolled with the consumer provider.

16. The system of claim 15, wherein the enrollment device further comprises a communication device.

17. The system of claim 16, wherein the memory comprises a memory local to the enrollment device, and a database remote from the enrollment device, and wherein the enrollment device accesses the database over a communication network via the communication device.

18. The system of claim 17, wherein the information associated with the good or service available from the consumer provider is maintained on the database and the instructions are maintained on the memory local to the enrollment device.

19. The system of claim 17, wherein the enrollment device is a first enrollment device, the system further comprising:
 a payment provider control, wherein the first enrollment device is communicably coupled to payment provider control via the communication network; and
 a second enrollment device communicably coupled to the payment provider control via the communication network.

* * * * *